(12) United States Patent
Van Hinsbergh

(10) Patent No.: US 12,071,926 B2
(45) Date of Patent: Aug. 27, 2024

(54) APPARATUS

(71) Applicant: C-LING LIMITED, Gloucester (GB)

(72) Inventor: Gregory Van Hinsbergh, Gloucester (GB)

(73) Assignee: C-LING LIMITED, Gloucester (GB)

( * ) Notice: Subject to any disclaimer, the term of this patent is extended or adjusted under 35 U.S.C. 154(b) by 0 days.

(21) Appl. No.: 17/885,267

(22) Filed: Aug. 10, 2022

(65) Prior Publication Data

US 2023/0036999 A1 Feb. 2, 2023

Related U.S. Application Data

(63) Continuation of application No. 16/337,785, filed as application No. PCT/GB2017/052901 on Sep. 28, 2017, now Pat. No. 11,473,563.

(30) Foreign Application Priority Data

Sep. 28, 2016 (GB) .................................. 1616488
Nov. 21, 2016 (GB) .................................. 1619657

(51) Int. Cl.
  *F16J 15/52* (2006.01)
  *E02B 17/00* (2006.01)
  (Continued)

(52) U.S. Cl.
  CPC .............. *F03D 13/25* (2016.05); *E02B 17/00* (2013.01); *F03D 80/85* (2016.05); *F16J 15/52* (2013.01);
  (Continued)

(58) Field of Classification Search
  CPC .......... F03D 13/25; F03D 80/85; E21B 17/00; H02G 1/10; H02G 1/081; H02G 3/22;
  (Continued)

(56) References Cited

U.S. PATENT DOCUMENTS

| 2,354,874 A | 8/1944 | Myers |
| 3,029,083 A | 4/1962 | Wilde |

(Continued)

FOREIGN PATENT DOCUMENTS

| CN | 101351665 | 1/2009 |
| CN | 201682250 | 12/2010 |

(Continued)

OTHER PUBLICATIONS

International Search Report and Written Opinion of the International Searching Authority prepared by the European Patent Office in connection with PCT/GB2017/052901, dated Apr. 23, 2018; Entire Document, 15 pages.

(Continued)

*Primary Examiner* — Gilbert Y Lee
(74) *Attorney, Agent, or Firm* — Sheridan Ross P.C.

(57) ABSTRACT

An annular seal member comprising a seal body comprising a locating portion locatable against a wall element of an offshore structure, an inner surface, an outer surface and a lip portion that defines an open mouth of the seal member for receiving an elongate element therethrough; wherein the seal body is locatable against the wall element such that when a static pressure acting on the outer surface of the seal body exceeds a static pressure acting on the inner surface of the seal body a net positive pressure is exerted on the outer surface which at least partly deforms inwardly to provide a portion of the seal body for sealing against an outer surface of the elongate element. An offshore structure.

20 Claims, 30 Drawing Sheets

(51) Int. Cl.
*F03D 13/25* (2016.01)
*F03D 80/80* (2016.01)
*H02G 1/10* (2006.01)
*H02G 3/22* (2006.01)
*H02G 1/08* (2006.01)
*H02G 9/02* (2006.01)

(52) U.S. Cl.
CPC .................. *H02G 1/10* (2013.01); *H02G 3/22* (2013.01); *E02B 2017/0065* (2013.01); *E02B 2017/0091* (2013.01); *E02B 2017/0095* (2013.01); *F05B 2240/95* (2013.01); *H02G 1/081* (2013.01); *H02G 9/02* (2013.01); *Y02E 10/72* (2013.01)

(58) Field of Classification Search
CPC .............. H02G 9/02; E02B 2017/0065; E02B 2017/0091; E02B 2017/0095; F05B 2240/95; Y02E 10/72; F16J 15/50; F16J 15/52
See application file for complete search history.

(56) References Cited

U.S. PATENT DOCUMENTS

| | | | |
|---|---|---|---|
| 3,449,965 A * | 6/1969 | Ross | F16J 15/52 74/18.1 |
| 3,611,816 A | 10/1971 | Wedekind et al. | |
| 4,058,987 A | 11/1977 | Gerbault et al. | |
| 4,240,767 A | 12/1980 | Gracia | |
| 4,252,120 A | 2/1981 | Carpenter | |
| 5,865,566 A | 2/1999 | Finn | |
| 5,913,521 A | 6/1999 | Sangren et al. | |
| 6,003,873 A | 12/1999 | Solberg | |
| 6,537,118 B2 | 3/2003 | McAlpine | |
| 6,755,595 B2 | 6/2004 | Oram | |
| 6,821,055 B2 | 11/2004 | Oram | |
| 7,056,219 B2 | 6/2006 | Toriumi et al. | |
| 7,100,641 B2 | 9/2006 | Tyrer et al. | |
| 7,749,035 B2 | 7/2010 | Oram et al. | |
| 8,033,302 B2 | 10/2011 | Standal et al. | |
| 9,190,820 B2 | 11/2015 | Nurmi et al. | |
| 9,249,899 B2 | 2/2016 | Bang-Andreasen et al. | |
| 10,199,808 B2 | 2/2019 | Bang-Andreasen | |
| 11,473,563 B2 | 10/2022 | Van Hinsbergh | |
| 2005/0121092 A1 | 6/2005 | Kiest, Jr. et al. | |
| 2006/0058577 A1 | 3/2006 | Davies et al. | |
| 2006/0196539 A1 | 9/2006 | Raska et al. | |
| 2007/0051419 A1 | 3/2007 | Walsh | |
| 2008/0245433 A1 | 10/2008 | Warren | |
| 2008/0245933 A1 | 10/2008 | Stokes | |
| 2008/0251668 A1 | 10/2008 | Stokes | |
| 2009/0126819 A1 | 5/2009 | Beesley | |
| 2009/0272855 A1 | 11/2009 | Oram | |
| 2011/0140426 A1 | 6/2011 | Garcia Lopez et al. | |
| 2011/0226527 A1 | 9/2011 | Ritchie-Bland | |
| 2012/0282035 A1 | 11/2012 | Ebert | |
| 2013/0082447 A1 | 4/2013 | Evans et al. | |
| 2014/0131956 A1 | 5/2014 | Snethun | |
| 2014/0255102 A1 | 9/2014 | Bang-Andresen et al. | |
| 2015/0064477 A1 | 3/2015 | Oram et al. | |
| 2016/0002874 A1 | 1/2016 | Schultes | |
| 2016/0053894 A1 | 2/2016 | Mueller-Niehuus et al. | |
| 2017/0279258 A1 | 9/2017 | Meseti | |
| 2018/0198264 A1 | 7/2018 | Bang-Andreasen | |
| 2019/0181623 A1 | 6/2019 | Andreasen | |
| 2019/0186208 A1 | 6/2019 | Noble et al. | |
| 2019/0214801 A1 | 7/2019 | Smith et al. | |
| 2019/0229505 A1 | 7/2019 | Bang-Andreasen | |

FOREIGN PATENT DOCUMENTS

| | | | |
|---|---|---|---|
| CN | 104094024 | 10/2014 | |
| DE | 19617437 | 11/1997 | |
| DE | 202004020720 | 1/2006 | |
| DE | 202009006507 | 8/2009 | |
| DE | 202010002679 | 6/2010 | |
| DE | 202012102174 | 10/2012 | |
| DK | 201170676 | 6/2013 | |
| EP | 1049228 | 11/2000 | |
| EP | 1586922 | 10/2005 | |
| EP | 1850044 | 10/2007 | |
| EP | 1985845 | 10/2008 | |
| EP | 2261080 | 12/2010 | |
| EP | 2279979 | 2/2011 | |
| EP | 2302211 | 3/2011 | |
| EP | 2361752 | 8/2011 | |
| EP | 2426356 | 3/2012 | |
| EP | 2462976 | 6/2012 | |
| EP | 2721700 | 4/2014 | |
| EP | 2784364 | 10/2014 | |
| EP | 2784365 | 10/2014 | |
| EP | 2897233 | 7/2015 | |
| EP | 3299690 | 3/2018 | |
| EP | 3338879 | 6/2018 | |
| EP | 3410550 | 12/2018 | |
| FI | 125437 | 10/2015 | |
| FR | 2926345 A1 * | 7/2009 | .......... F16C 33/6618 |
| FR | 2983551 | 6/2013 | |
| GB | 2297593 | 8/1996 | |
| GB | 2349414 | 11/2000 | |
| GB | 2358691 | 8/2001 | |
| GB | 2365941 | 2/2002 | |
| GB | 2378969 | 2/2003 | |
| GB | 2391255 | 2/2004 | |
| GB | 2499683 | 8/2013 | |
| GB | 2520837 | 6/2015 | |
| GB | 2521922 | 7/2015 | |
| GB | 201715211 | 11/2017 | |
| JP | S57-13696 | 3/1982 | |
| JP | H02-97771 | 4/1990 | |
| JP | 2002-333086 | 11/2002 | |
| JP | 2004-040940 | 2/2004 | |
| JP | 2005-188651 | 7/2005 | |
| JP | 2012-237340 | 12/2012 | |
| JP | 5327202 | 10/2013 | |
| JP | 2014-180139 | 9/2014 | |
| JP | 5762817 | 8/2015 | |
| TW | 201415741 | 4/2014 | |
| WO | WO 91/03674 | 3/1991 | |
| WO | WO 02/08139 | 1/2002 | |
| WO | WO 03/106877 | 12/2003 | |
| WO | WO 2006/024244 | 3/2006 | |
| WO | WO 2010/139725 | 12/2010 | |
| WO | WO 2011/131918 | 10/2011 | |
| WO | WO 2011/141494 | 11/2011 | |
| WO | WO 2012/072063 | 6/2012 | |
| WO | WO 2012/167015 | 12/2012 | |
| WO | WO 2013/050451 | 4/2013 | |
| WO | WO 2013/083478 | 6/2013 | |
| WO | WO 2013/083802 | 6/2013 | |
| WO | WO 2014/081501 | 5/2014 | |
| WO | WO 2015/071679 | 5/2015 | |
| WO | WO 2015/071680 | 5/2015 | |
| WO | WO 2017/093725 | 6/2017 | |
| WO | WO 2017/191474 | 11/2017 | |
| WO | WO 2017/194067 | 11/2017 | |
| WO | WO 2017/211810 | 12/2017 | |
| WO | WO 2017/211815 | 12/2017 | |
| WO | WO 2017/216298 | 12/2017 | |
| WO | WO 2018/033703 | 2/2018 | |
| WO | WO 2018/060004 | 4/2018 | |
| WO | WO 2018/095643 | 5/2018 | |
| WO | WO 2018/115056 | 6/2018 | |
| WO | WO 2018/115176 | 6/2018 | |
| WO | WO 2019/025316 | 2/2019 | |
| WO | WO 2019/030541 | 2/2019 | |
| WO | WO 2019/043412 | 3/2019 | |
| WO | WO 2019/058093 | 3/2019 | |

(56) References Cited

OTHER PUBLICATIONS

International Preliminary Report on Patentability prepared by the International Bureau of WIPO in connection with PCT/GB2017/052901, dated Apr. 11, 2019; Entire Document, 14 pages.
Official Action with English Translation for China Patent Application No. 201780060308.7, dated Aug. 19, 2020, 21 pages.
Official Action with machine translation for China Patent Application No. 201780060308.7, dated Jun. 9, 2021, 21 pages.
Official Action for United Kingdom Patent Application No. GB2007657.6, dated Jun. 18, 2020, 3 pages.
Official Action (with English translation) for India Patent Application No. 201937011764, dated Jun. 30, 2021, 7 pages.
Official Action (with English translation) for Japan Patent Application No. 2019-537899, dated Jul. 25, 2022, 9 pages.
Official Action (with English translation) for Korea Patent Application No. 10-2019-7012091, dated Mar. 17, 2022, 22 pages.
Search Report for Taiwan Patent Application No. 107103741, dated Aug. 19, 2021, 1 page.
Official Action for U.S. Appl. No. 16/337,785, dated Jul. 20, 2021, 10 pages.
Official Action for U.S. Appl. No. 16/337,785, dated Nov. 12, 2021, 10 pages.
Official Action for U.S. Appl. No. 16/337,785, dated Feb. 17, 2022, 11 pages.
Notice of Allowance for U.S. Appl. No. 16/337,785, dated May 13, 2022, 7 pages.
Supplemental Notice of Allowance for U.S. Appl. No. 16/337,785, dated Sep. 21, 2022, 4 pages.

* cited by examiner

APPARATUS

CROSS-REFERENCE TO RELATED APPLICATIONS

This application is a continuation of U.S. patent application Ser. No. 16/337,785, filed Mar. 28, 2019, which is a U.S. National Phase Application of PCT/GB2017/052901, filed Sep. 28, 2017, which claims priority to GB Application No. 1619657.8, filed Nov. 21, 2016, and to GB Application No. 1616488.1, filed Sep. 28, 2016, each of which is incorporated herein in their entirety by reference.

BACKGROUND OF THE INVENTION

This invention relates to an annular seal and a support structure.

Offshore structures, such as wind turbines, have to deal with corrosion as most are constructed from standard offshore steel grades which are corroded by sea water.

The surfaces of the structures can be coated with various types of paint, including those used by the shipping industry. However, paint gets damaged and so requires regular maintenance.

Offshore wind turbines face the added challenge of having to retrieve power generated by the turbine via a power cable. Typically, the cable extends downwardly to a monopile which supports the wind turbine and exits through a circular port provided in the monopile below sea level. In order to prevent sea water from entering the monopile and corroding the inside, seals are provided around the cable.

However, it has been shown that many existing seals tend to work loose or fail so that fresh oxygenated sea water enters the monopile and accelerates corrosion. It has been further shown that once a seal has been breached, the level of sea water within the monopile fluctuates, thereby exposing the inside of the monopile to high levels of oxygen and seawater thereby exacerbating the corrosion.

It is an aim of the present invention to at least partly mitigate the above-mentioned problems.

According to a first aspect of the present invention there is provided an annular seal member comprising: a seal body comprising a locating portion locatable against a wall element of an offshore structure, an inner surface an outer surface and a lip portion that defines an open mouth of the seal member for receiving an elongate element therethrough; wherein the seal body is locatable against the wall element such that when a static pressure acting on the outer surface of the seal body exceeds a static pressure acting on the inner surface of the seal body a net positive pressure is exerted on the outer surface which at least partly deforms inwardly to provide a portion of the seal body for sealing against an outer surface of the elongate element.

The elongate element may comprise an umbilical or power cable or the like.

The elongate element may be flexible.

The seal body may comprise a resilient material which deforms under the net positive pressure.

The locating portion may comprise a flange portion.

The flange portion may comprise at least one recess region that extends circumferentially around the flange. The recess region may comprise a hydrophilic material. The hydrophilic material may comprise rubber which may comprise polychloroprene, modified with a hydrophilic substance, which may comprise bentonite.

A hydrophilic material in the context of the present invention is a material which expands on absorption of water when not constrained. It may be termed an expandable hydrophilic material. An expandable hydrophilic material may be a hydrophilic material which exhibits an increase in volume which is greater than 100% of the original (i.e. dry) volume, for example, greater than 200% of the original volume or greater than 500% of the original volume or greater than 1000% of the original volume. The hydrophilic material may expand by at least 500% or at least 800% or at least 1000% of its original volume when saturated with water. The hydrophilic material may expand by not more than 1500%, for example not more than 1300% of its original volume when saturated with water.

A hydrophilic material comprising polychloroprene modified with bentonite is particularly effective as a hydrophilic material in saline water, in particular water having a salinity concentration of at least 2%, for example seawater having a salinity concentration of at least 3.5%. Such a hydrophilic material is therefore particularly suitable for sealing submerged structures in a marine environment, such as a monopile and cable arrangement for an offshore wind turbine.

The flange portion may comprise at least one magnetic element for securing the flange portion to the wall element.

The seal body may comprise an intermediate portion extending in the direction from the locating portion to the lip portion, at least part of the outer surface and at least part of the inner surface being provided on the intermediate portion wherein the intermediate portion converges towards the lip portion.

The intermediate portion may be substantially frusto-conical.

The intermediate portion may define a chamber for receiving the elongate element which is larger than the space occupied by the elongate element within the chamber.

The lip portion may comprise at least one lip recess region that extends circumferentially around an inner surface of the lip portion. The lip recess region may comprise a hydrophilic material. The hydrophilic material may comprise rubber, which may comprise polychloroprene, modified with a hydrophilic substance, which comprises bentonite.

The seal body may comprise a resilient material. At least one split may be provided along the length of the seal body such that the seal body is openable along the split for insertion of an elongate element.

The seal body may comprise a first fastening portion on a first portion of the seal body adjacent the split and a second fastening portion on a second portion of the seal body adjacent an opposite side of the split, wherein the fastening portions are arranged to be secured together. The first and second fastening portions may have a hydrophilic material, such as the hydrophilic material described previously, disposed between them to aid sealing between the fastening portions.

The seal body may comprise a flexible tubular element which extends along a region of the seal body between the lip portion and a portion of the seal body which is locatable against the wall element.

The flexible tubular element may be at least 1 m or at least 5 m or at least 10 m or at least 20 m or at least 30 m in length.

The seal body may define a chamber through which when received, the elongate element extends, the chamber is configured for receiving an annular hydrophilic sealing element. The seal body may be configured to constrain expansion of the hydrophilic sealing element within the chamber in at least one direction. The chamber may be cylindrical and the seal body configured to constrain the hydrophilic sealing element in a radial direction. The seal body may be configured to allow expansion of the sealing element within the chamber in the axial direction. The seal body may be configured to allow expansion of the sealing element by at least 5% of the original (i.e. dry) volume for example at least 10% of the original volume. The seal body may be configured to limit expansion of the sealing element to not more than 50% increase in original volume, for example not more than 20% increase in original volume.

At least a portion of the chamber may converge towards one end of the chamber. The chamber may converge at both ends of the chamber.

The seal body may be configured to constrain expansion of the hydrophilic sealing element within the chamber in a direction which is perpendicular to the direction in which the cable extends through the chamber when received in the chamber.

According to sixth aspect of the invention there is provided a sealing element comprising a hydrophilic material, wherein at least a portion of the sealing element is helical. The sealing element may have free ends such that the sealing element can be fitted to an elongate element by inserting the elongate element between a free end and an adjacent coil formed by the helical arrangement and then moving the elongate element between the coils until the elongate element exits from between the other free end so that that the sealing element is wound around the elongate element.

The hydrophilic material may comprise rubber modified with a hydrophilic substance. The rubber may comprise polychloroprene. The hydrophilic substance may comprise bentonite.

The sealing element may comprise at least two coils or at least three coils or at least four coils.

According to a second aspect of the invention there is provided an offshore structure, comprising: a wall element which defines a chamber; at least one aperture through the wall element at a lower portion of the wall element; at least one flexible elongate element each extending through a respective aperture in the wall element; and at least one seal body each located at a respective interface region between the wall element and a respective elongate element; wherein each seal body is arranged so that a respective water level within the chamber relative to a surrounding water level is maintained at a desired level to provide a sealing pressure on the seal body to seal a respective interface region to prevent ingress of sea water into the sealed space.

The wall element may be substantially cylindrical.

Each seal body may be disposed within the chamber.

Each seal body may be arranged such that a higher water level within the chamber than the surrounding water level provides a sealing pressure on the seal body.

Each seal body may be arranged such that a water level within the chamber which is lower than the surrounding water level causes water to flow into the chamber through the seal body.

According to a third aspect of the invention, there is provided a sealing arrangement comprising a tubular member and an annular sealing member at one end, the annular sealing member having a seal body comprising a locating portion locatable against a wall element of an offshore structure, an inner surface and an outer surface, wherein the locating portion comprises a sealing portion which abuts the wall element when the locating portion is located against the wall element and the seal body is locatable such that a static pressure acting on the outer surface of the seal body exceeds a static pressure acting on the inner surface of the seal body a net positive pressure is exerted on the outer surface which urges the sealing portion into sealing engagement with the wall element.

The sealing portion may be a flange portion. The flange portion may have a generally annular configuration. The tubular member may be a flat hose construction. "Flat hose" is a term used in the art to describe a pipe which can be rolled in a flat configuration. An example is an Oroflex™ layflat hose marketed as OROFLEX 80.

According to a fourth aspect of the invention, there is provided a cable protection system comprising a tubular member, such as a J-tube or an I-tube, and a sealing arrangement in accordance with the third aspect of the invention.

According to a fifth aspect of the invention, there is provided a cable protection system comprising a tubular member, such as a J-tube or an I-tube, and a sealing arrangement in accordance with the first aspect of the invention.

DESCRIPTION OF THE DRAWINGS

Embodiments of the present invention will now be described hereinafter, by way of example only, with reference to the accompanying drawings in which.

DETAILED DESCRIPTION OF THE DRAWINGS

Figure 1:
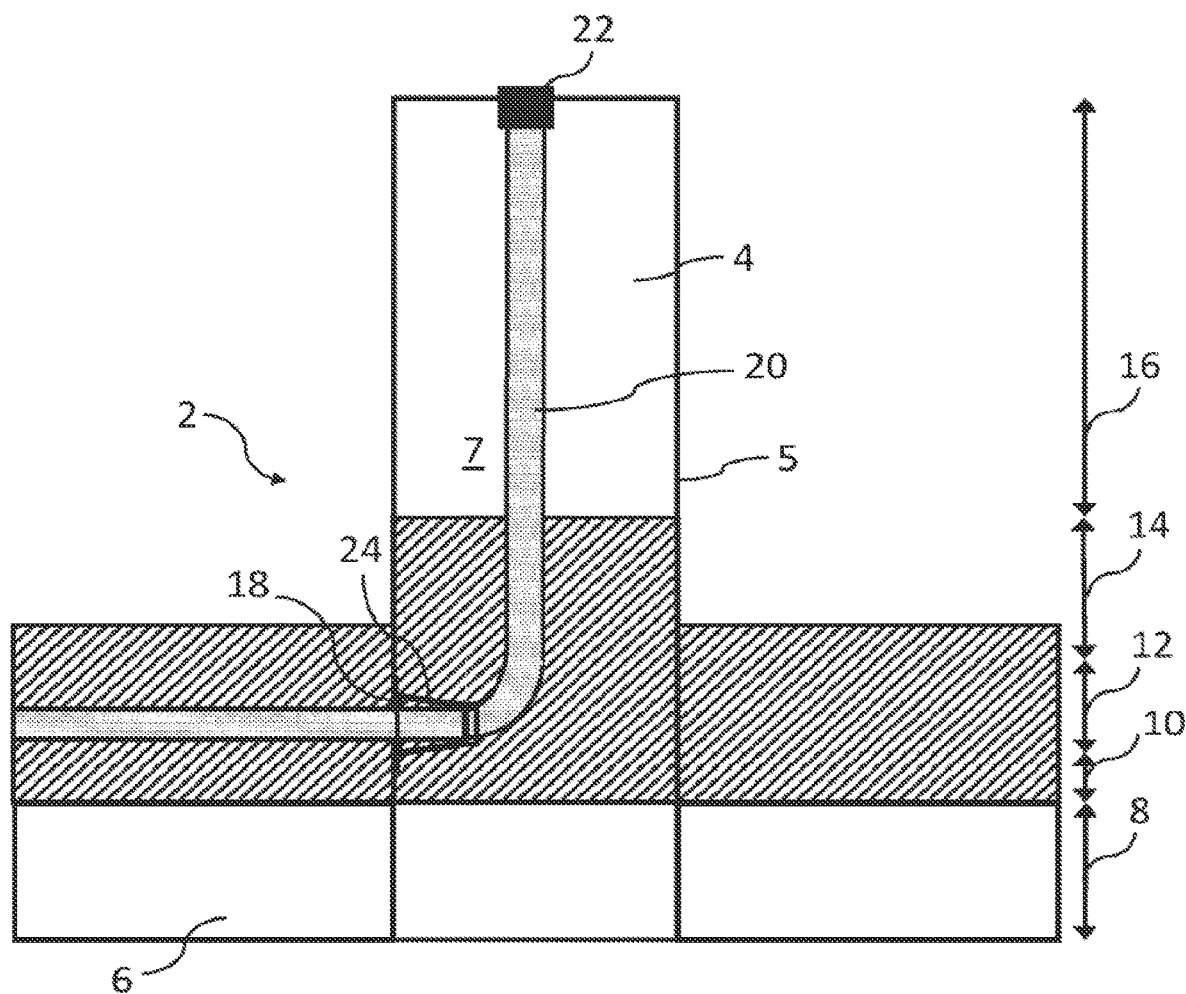
FIG. 1 is a schematic illustration of a support assembly for an offshore structure located on a sea bed.

FIG. 1 shows a schematic representation of a support assembly 2 of an offshore structure such as a wind turbine.

The support assembly 2 comprises a base in the form of a monopile 4 which is fixed to the sea bed 6 by securing the lower end of the monopile 4 in a bore in the sea bed 6.

The monopile 4 is tubular and comprises a cylindrical outer wall 5 having a wall thickness which is not less than 25 mm and not greater than 200 mm. The diameter of the monopile 4 is approximately 6000 mm at the base. The monopile 4 is fabricated, at least in part, from a metal such as steel. The monopile 4 defines an internal chamber 7 which extends upwardly within the monopile 4. The internal chamber 7 is sealed at the bottom, either by the sea bed in which the monopile 4 is located or by an additional liner at the lower end of the chamber 7 which may be used if the monopile 4 is installed on porous sediment. The internal chamber 7 forms a reservoir in which water can be stored.

The monopile 4 extends upwardly from the sea bed so that it spans five environmental zones: the buried zone 8, the scour zone 10, the submerged zone 12, the splash/tidal range zone 14 and the atmospheric zone 16.

The lowermost zone is the buried zone 8, in which the monopile 4 is buried in the sea bed. Immediately above is the scour zone 10 in which the monopile is subject to abrasive particles from the sea bed. Immediately above the scour zone 10 is the submerged zone 12 in which the monopile 4 always remains submerged. Above the submerged zone 12 is the splash/tidal range zone in which the monopile is periodically submerged and exposed to the atmosphere due to fluctuations in water level caused by tides, variations in atmospheric pressure and waves. The highest zone is the atmospheric zone which is typically above the highest level that the surrounding water that could be reasonably expected to reach over the lifetime of a wind turbine, such as the maximum wave height that could be expected over a 200 year period. The portion of the monopile 4 in the atmospheric zone is therefore rarely, if ever, submerged.

An access port 18 is provided in the cylindrical outer wall 5 in the region which occupies the submerged zone. In the embodiment shown, the access port 18 is circular and has a diameter of approximately 450 mm. The access port may be ovoid or any other suitable shape.

The support assembly 2 further comprises an elongate cable arrangement 20, such as a cable protection system comprised of a single tube, which extends downwardly within the internal chamber 7 from a hang-off clamp 22 at the top of the monopile 4. The cable arrangement 20 extends from the internal chamber 7 through the access port 18 to where it is connected to a power network. The cable arrangement 20 comprises main power cables for transmitting power generated by the wind turbine together with service cables. The power cables and service cables are protected by a tubular sleeve which is commonly referred to as a cable protection system. The diameter of the access port 18 is greater than the diameter of the cable arrangement 20 in order to enable easy installation and to accommodate flexing of the cable arrangement 20.

The support assembly 2 further comprises an annular seal 24, having an inner surface 24a and an outer surface 24b, which surrounds the access port 22 and the cable arrangement 20.

Figure 2:
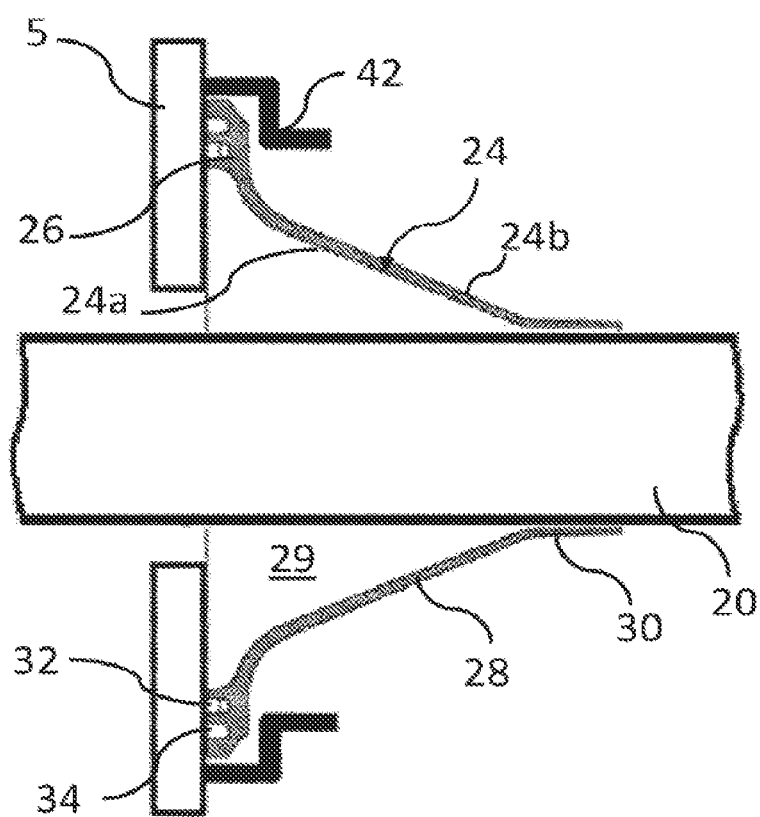
FIG. 2 is a schematic representation of part of the support assembly shown in FIG. 1 comprising an annular seal.

FIG. 2 shows a schematic representation of a portion of the support assembly 2 shown in FIG. 1 in the region of the annular seal 24. The annular seal 24 comprises a seal body having a flange portion 26, a conical portion 28 and a tubular portion 30. The flange portion 26 forms the base of the annular seal 24 which abuts the outer wall 5 of the monopile 4. The conical portion 28 has a larger diameter end joining the flange portion 26 and a smaller diameter end joining the tubular portion 30. The conical portion 28 converges in the direction away from the flange portion 26 and defines a chamber 29 which converges from the flange portion 26 to the tubular portion 30. Alternatively, the conical portion 28 could comprise a bellows arrangement in order to improve articulation of the seal 24. The tubular portion 30 has an inner diameter which corresponds to the outer diameter of the cable arrangement 20 so that the tubular portion 30 forms a sleeve over the cable arrangement 20 which is in contact with the outer surface of the cable arrangement 20. The diameter of the tubular portion 30 corresponds to the diameter of the narrow end of the conical portion 28. The other, wide, end of the conical portion 28 has a diameter which is greater than the diameter of the cable arrangement 20. The tubular portion 30 defines a lip which forms an open mouth of the annular seal 24. In some embodiments, the tubular portion 30 could be bonded or mechanically fixed to the cable arrangement.

Figure 3:
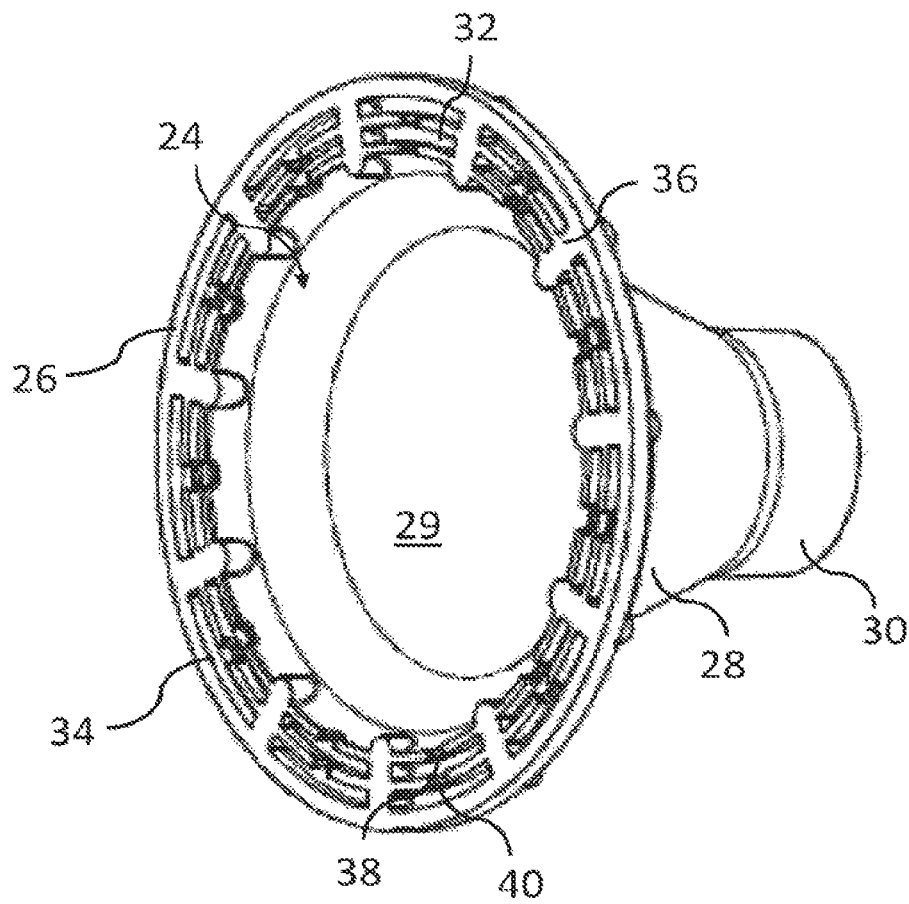
FIG. 3 is a perspective view of the annular seal depicted in FIG. 2 in isolation.

The surface of the flange portion 26 which abuts the outer wall 5 has radially inner and outer circumferentially extending grooves 32, 34. FIG. 3 shows the annular seal 24 in isolation. The circumferential grooves 32, 34 are held apart by circumferentially spaced webs 36. Circumferentially spaced apertures 38, 40 are provided in the walls of the grooves 32, 34 respectively. The apertures 38, 40 provide fluid communication between each of the circumferential grooves 32, 34 and between the inner groove and the inner chamber 29 defined by conical portion 28.

Hydrophilic elements may be placed within the grooves 32, 34 to expand once the annular seal 24 is submerged. The hydrophilic elements improve sealing against the outer wall 5.

The annular seal 24 is formed from a compliant material such as an elastomer or rubber which allows the flange portion 26 to conform to the shape of the inner surface of the outer wall 5. The material should preferably be sufficiently flexible so that the annular seal 24 can accommodate movement between the cable arrangement 20 and the outer wall 5 of the monopile 4 and resilient so that it maintains sealing engagement with the tubular portion 30 and the cable arrangement 20. The annular seal 24 is a moulded component with the circumferential grooves 32, 34 and webs 36 formed integrally.

A mechanical fixing 42 in the form of a ring, shown in FIG. 2, secures the flange portion 26 to the outer wall 5 of the monopile 4. It will be appreciated that the annular seal 24 may be secured to the outer wall 5 by other means such as an adhesive, a retention slot provided on the outer wall 5 for receiving the flange portion 26, a clamping arrangement or a magnetic fastener. The flange portion 26 may be reinforced, for example by a steel/composite ring to prevent a pressure difference acting across the flange portion 26 from distorting its shape.

The tubular portion 30 of the annular seal 24 may be provided with circumferential ribs to stop the annular seal 24 from sliding along the cable arrangement 20.

The material of the annular seal 24 may be reinforced with fibres, such as aramid fibres, on the top and bottom in order to react moment forces as tensile forces.

The support assembly 2 is assembled by attaching the flange portion 26 of the annular seal 24 to the inner surface of the outer wall 5 of the monopile 4. The base of the monopile 4 is then secured in position on the sea bed (or any suitable underwater structure). One end of the cable arrangement 20 is drawn through the access port 18 and through the annular seal 24 surrounding the access port 18 into the internal chamber 7 of the monopile 4. The cable arrangement 20 is then hoisted up through the internal chamber 7 and connected to the hang-off clamp 22 at the top of the monopile 4.

When installed, the internal chamber 7 is filled with water (depicted by diagonal lines thin the chamber 7) to a level which is equal to or greater than the height of the top of the splash zone. The internal chamber 7 may be filled by pumping water directly into the internal chamber 7. Alternatively, once the support assembly 2 is installed, the water level on the outside of the monopile 4 (depicted by diagonal lines in the external region of the monopile) could be allowed to rise naturally for example, by a rising tide. The increased pressure on the outside of the monopile 4 caused by the increase in the water level acts on the inner surface of the conical portion 28 of the annular seal 24 which is exposed to the surrounding water via the access port 18. The increase in pressure against the conical portion 28 forces the tubular portion 30 out of contact with the outer surface of the cable arrangement 20 allowing water to flow into the internal chamber 7. Once the water level within the chamber 7 reaches the same level as the surrounding water, the tubular portion 30 returns to contact the outer surface of the cable arrangement 20 to seal the internal chamber 7.

As surrounding water level drops, for example as the tide recedes, or the internal chamber 7 is filled above the level of the surrounding water (as shown in FIG. 1), pressure exerted by the water within the internal chamber 7 on the outer surface formed by the conical portion 28 and the tubular portion 30 of the annular seal exerts a radially inward force on the conical portion 28 and the tubular portion 30 to hold the tubular portion 30 in sealing engagement with the cable arrangement 20. The annular seal 24 therefore acts as a one-way valve which prevents water from escaping the internal chamber 7.

Furthermore, each successive tidal cycle, atmospheric pressure variation or wave that temporarily increases the height of the surrounding water above the height of the water within the chamber causes water to flow through the annular seal 24 into the internal chamber 7 and so progressively increases the height of the water level in the chamber 7. The arrangement is therefore self-regulating in maintaining the level of water within the chamber 7 at or above the level to which it is initially filled. Consequently, even if an imperfect seal is formed between the annular seal 24 and the cable arrangement 20, the addition of a pump or the periodic increases in the surrounding water level ensures that the water level within the chamber 7 does not fluctuate greatly. Small gaps between the annular seal 24 and the cable arrangement 20 or the outer wall 5 of the monopile 4 could also be expected to be filled by sediment once the support assembly 2 is installed, thereby reducing leakage from the internal chamber 7.

Once the level of the water within the internal chamber 7 is greater than the level of the surrounding water, the positive pressure acting on the outer surface of the conical portion 28 and the flange portion 26 holds the flange portion 26 in pressing engagement against the inner surface of the outer wall 5 of the monopile 4. The flange portion 26 therefore conforms to the shape of inner surface of the outer wall 5 and sealing between the flange portion 26 and the outer wall 5 is improved. Sealing of the flange portion 26 against the outer wall 5 is further improved by the circumferential grooves 32, 34 which are in fluid communication with the chamber 29 defined by the conical portion 28 via the apertures 38, 40 and are therefore at the same pressure as the chamber 29 and the surrounding sea water. A positive pressure difference between the top surface of the flange portion 26, which is exposed to the water in the internal chamber 7, and the circumferential grooves 32, 34 further improves sealing.

Maintaining a substantially constant level of water within the internal chamber 7 of the monopile 4 allows the oxygen to become depleted which slows down the rate of corrosion within the monopile 4. The water within the internal chamber 7 also becomes stagnant over time and additives can be added to inhibit corrosion.

It will be appreciated that in alternative embodiments the annular seal could be located on the outer surface of the outer wall 5 of the monopile 4 such that the water level within the internal chamber 5 is kept lower than the level of the surrounding water. However, the embodiment described above in which the annular seal 24 is located within the internal chamber 7 is beneficial because the seal is protected within the chamber 7 and so is less likely to be damaged.

The annular seal described above has the further benefit that it can be retrofitted to exiting wind turbines in which a cable arrangement exits though an access port in the support assembly. Firstly, the cable arrangement is disconnected within the wind turbine. Then, the annular seal is slid onto and along the cable arrangement so that the flange portion is brought into contact with an outer wall. The flange portion is then held in position, for example by magnetic elements such as magnetic elements bonded to the flange portion or magnetized ferrite elements within the flange material or bonding agents, and the cable can be reconnected. The internal chamber is then filled, for example using a pump, manual filling or naturally using tidal changes (as described above). Once the level of the water within the internal chamber exceeds the surrounding water level, the seal becomes self-sealing, as described with respect to the first embodiment.

Figure 5:
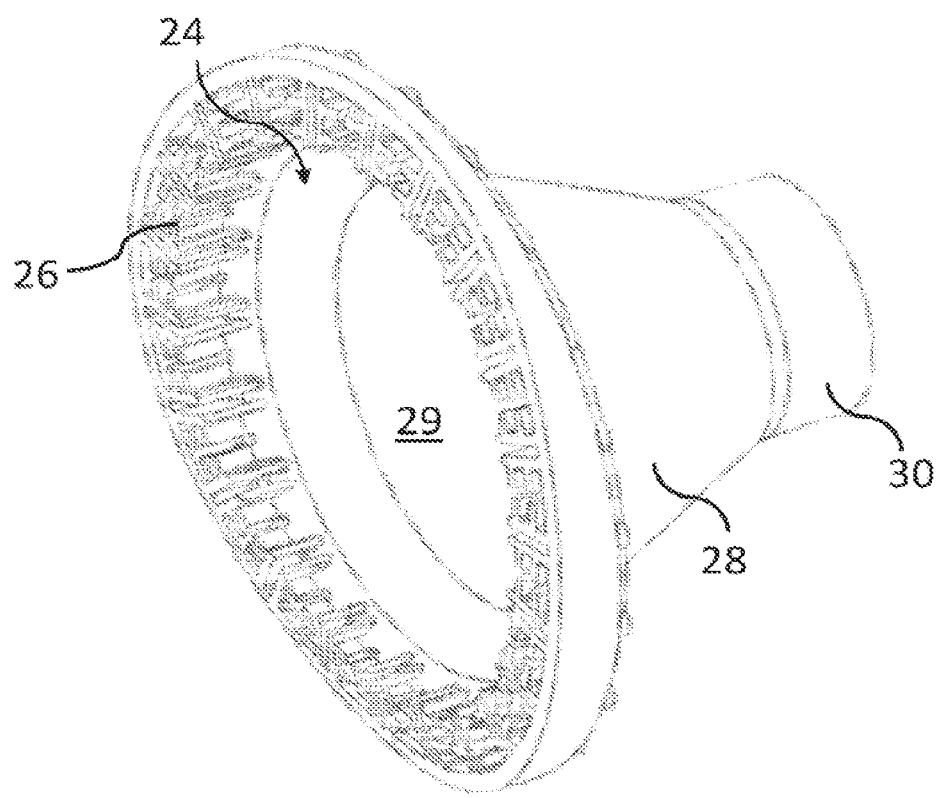
FIG. 5 is a perspective view of an alternative embodiment of an annular seal.

FIG. 5 shows an alternative embodiment of an annular seal 24 in which the surface of the flange portion 26 which makes contact with the outer wall 5 is curved to follow the profile of the outer wall 5. For example, the radius of curvature of the face of the flange portion 26 may be substantially the same as the radius of curvature of the inner surface of the outer wall. The arrangement further improves sealing.

Figure 6:
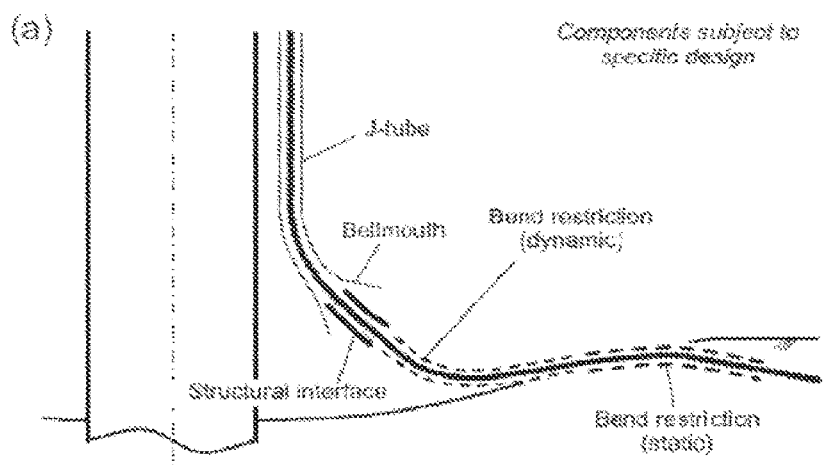
FIG. 6 is a diagram illustrating a J-tube arrangement.

FIG. 6 shows a J-tube arrangement which is commonly used in the offshore industry. The J-tube has a bell-mouth which is sealable by an annular seal having at least some features common to the annular seals described above. The annular seal could also be used to deal entry to an I-tube which, unlike a J-tube, has a bell-mouth that faces directly downwardly when in situ.

Figure 4:
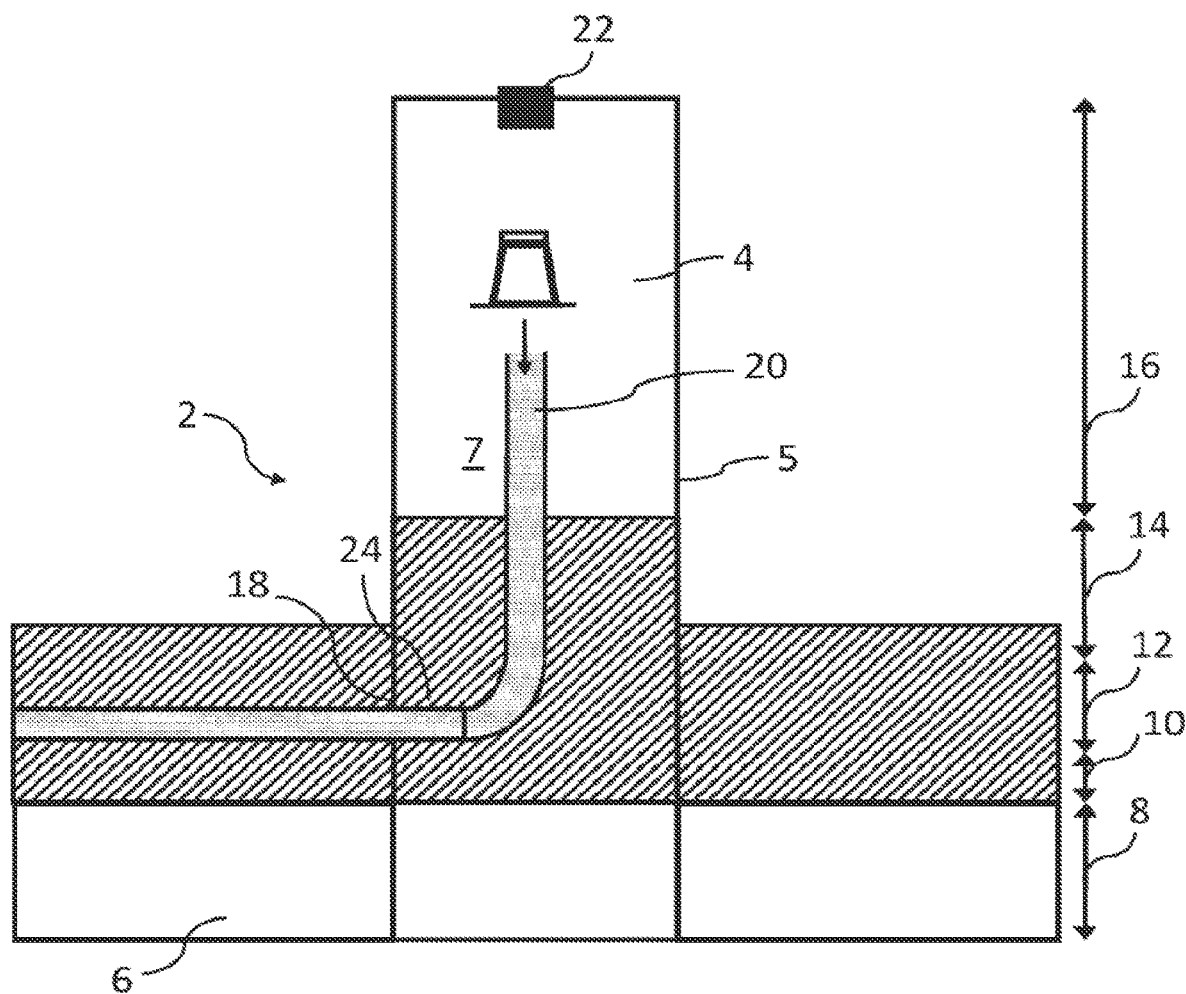
FIG. 4 is a schematic representation depicting assembly of a support structure.
Figure 7:
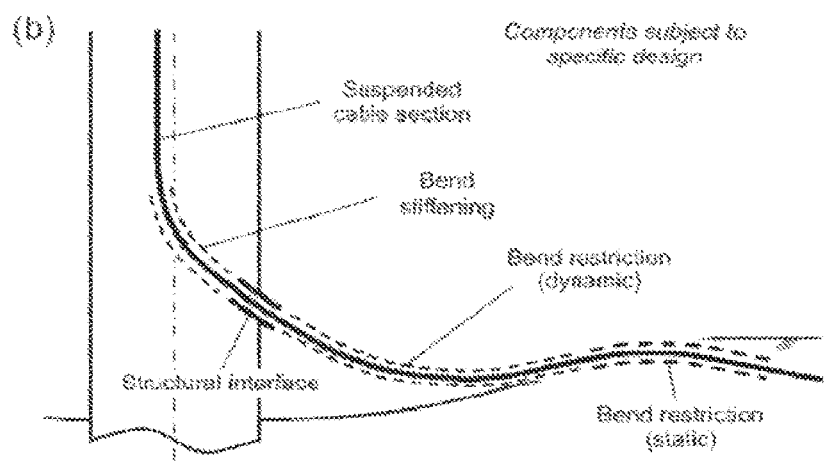
FIG. 7 is a diagram illustrating a monopile arrangement.
Figure 8:
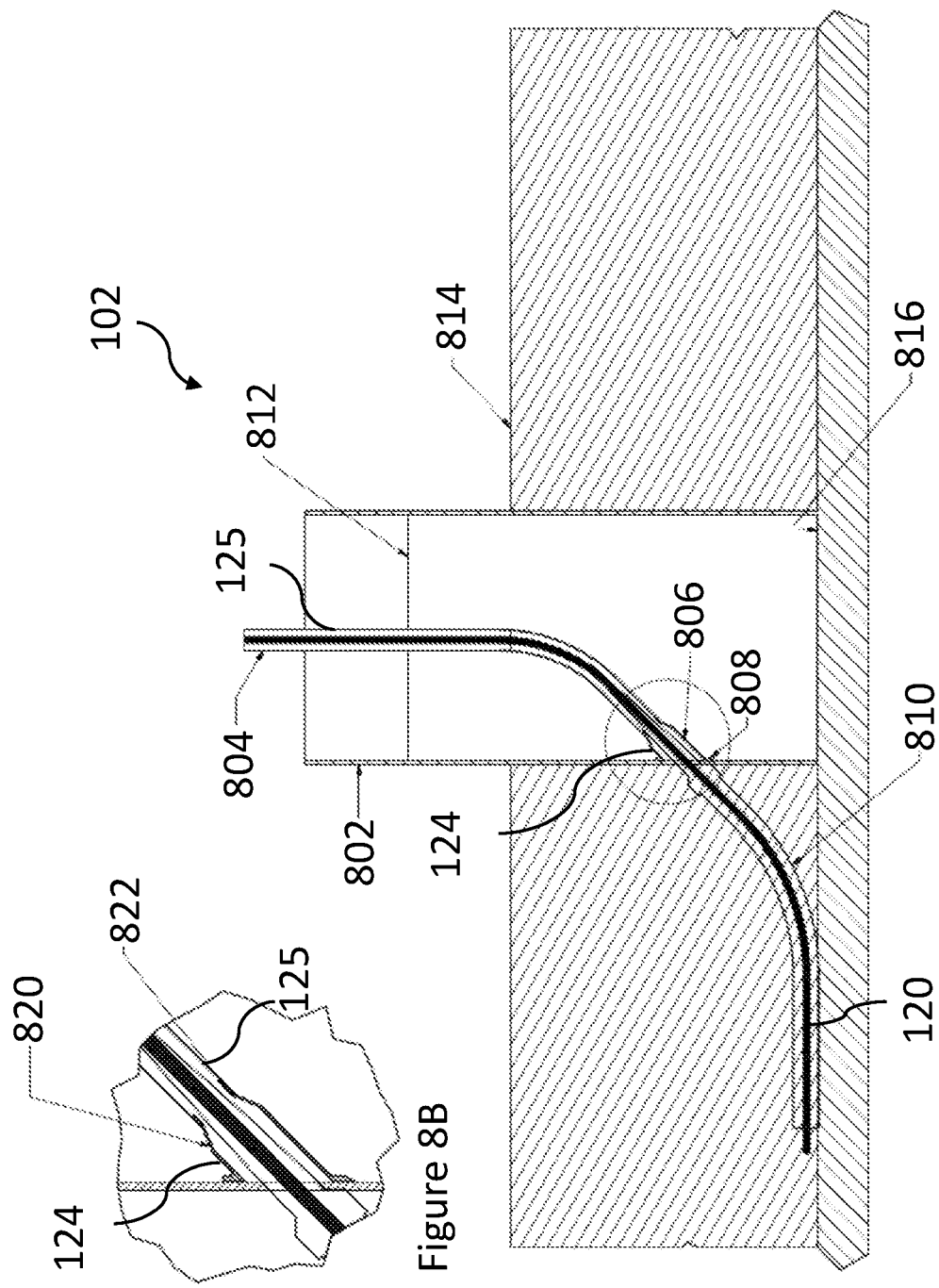
FIG. 8A is a diagram illustrating a monopile arrangement.
FIG. 8B is a diagram illustrating apportion of the monopile arrangement shown in FIG. 8A.

FIG. 7 shows a typical arrangement of an offshore structure, such as a monopile for a wind turbine, in which the cable enters the base of the monopile at an angle of approximately 45 degrees with respect to vertical. Although the support assemblies shown in FIGS. 1 and 4 show the cable entering a monopile at 90 degrees to the vertical, it will be appreciated that the schematics are intended to aid explanation and that monopiles have entry holes designed to industry standards which suggest that cable entry should be at 45 degrees to the vertical, as shown in FIG. 7. In such arrangements, the access port usually has an oval shape.

Further arrangements will now be described with reference to FIGS. 8A to 20 in connection with retro-fitting a seal member for offshore structures, such as monopiles, in which existing seals have failed; providing a sealing solution for new offshore installations comprising a hollow structure such as a monopile; and providing a sealing solution for J-tubes or I-tubes which are known terms in the art of offshore structures.

FIG. 8A shows a schematic representation of a support assembly 102 of an offshore structure. The support assembly 102 is similar to the support assembly 2 shown in FIG. 1. FIG. 8A further illustrates: a monopile 802; a rigid polymer tube or flexible flat hose 804; bellows 806; permanent magnets 808 bonded internally to bellows to initiate and temporarily locate sealing interface; a cable protection system 810 potentially with damaged seal allowing water exchange and aggressive corrosion of monopile in inter-tidal zone; seawater level 812 inside structure always higher than maximum sea level. However, should any part of the seal fail the system is self-energising and if the sea level was ever higher than the internal sea water level then the structure would automatically fill up; maximum envisaged height 814 of sea level; and a flexible liner 816 which may be required for porous sediment.

FIG. 8B illustrates the following: bellows 820 covers existing cable protection system including sealing interface (which could have failed or be leaking at slow rate); interface 822 between bellows/cone and tube molded together during manufacture of bellows or clamped in position against reinforcement rings which could be molded into bellows (as shown in FIG. 8B).

The support assembly 102 comprises a cable arrangement 120 and an annular seal 124 in the form of a bellow, which is similar to the annular seal 24 described above, connected to a sealing tube 125. The sealing tube 125 extends upwardly from the annular seal 124 to a transition piece (not shown). The tube going to the transition piece may be either a rigid polymer pipe (such as polyurethane, polyethylene or nitrile rubber) or a flat hose construction which is to ship and transport and retrofit onto a cable protection system offshore.

The annular seal 124 and the sealing tube 125 may be moulded together, for example as an integrally formed component, or clamped together. The annular seal 124 could, for example, comprise a reinforcement ring against which the sealing tube 125 is clamped.

The tube 125 can perform at temperatures up to 90° C. It is also coilable and can easily be transported up to the Wind Turbine Generator Transition Piece, unlike a typical 60 m solid polymer pipe used in the offshore industry.

Figure 9:
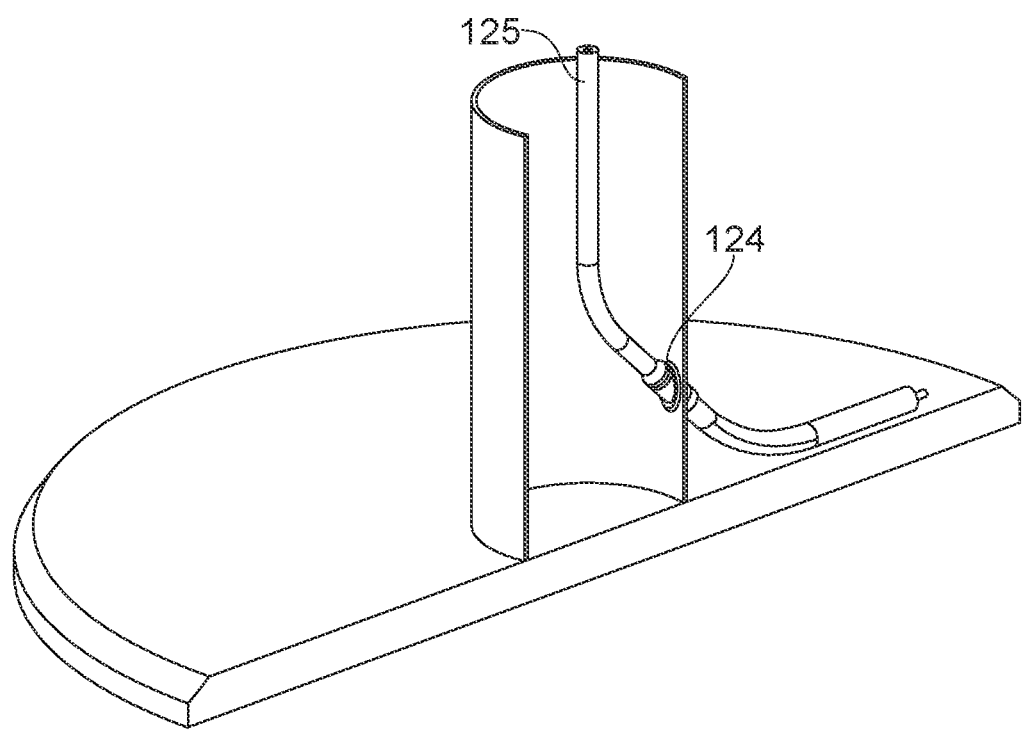
FIG. 9 is a perspective view of a monopile arrangement corresponding to the arrangement shown in FIG. 8A.

In order to fit, fitters have to disconnect the power cable from a junction box, slide the bellow 124 down the cable, with the tube 125 (e.g. flat hose) already bonded in position to the bellow 124 (to minimize leak paths). When the bellow 124 makes contact with the inner wall of the monopile the geometry of the system, gravity and additional guide ropes will enable the system to be installed roughly in the right position covering the monopile entry aperture for the cable and cable protection system. As described previously, magnetic elements such as permanent magnets can be bonded or otherwise fixed to the bellow 124 to provide an initial sealing force at the sealing interface with the monopile. The fitted arrangement is shown in FIG. 9.

Figure 10:
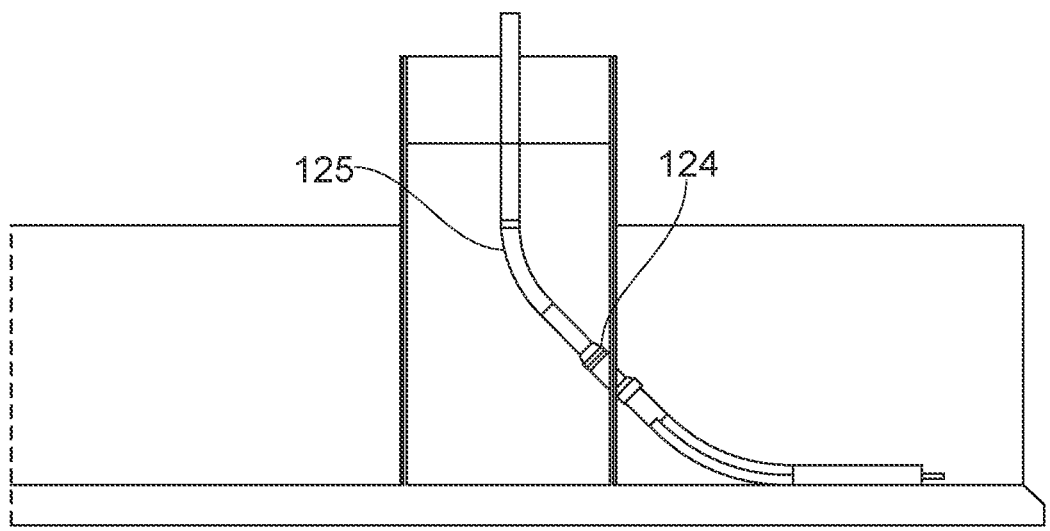
FIG. 10 is a partial sectional view of the monopile arrangement shown in shown in FIG. 9.
Figure 11:
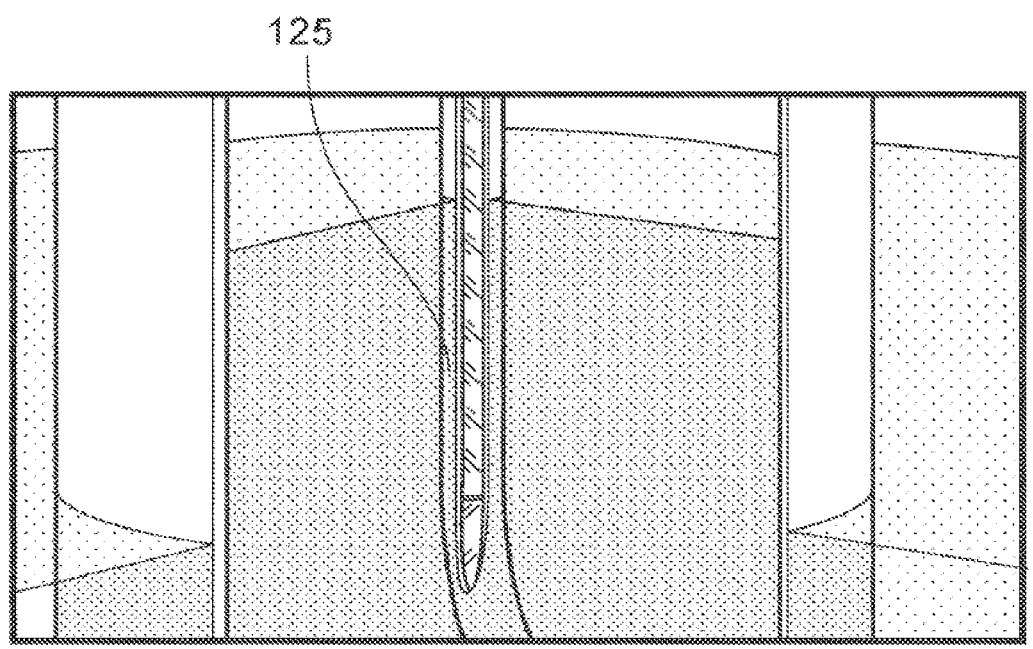
FIG. 11 is a partial sectional view of the monopile arrangement shown in FIGS. 9 and 10.

When the tube 125 from the bellow has been secured topside in the transition piece the inside of the monopile can be filled with water, to raise the differential pressure on the seal. If the sediment is porous it may be necessary to put a simple liner at the bottom of the structure. Again, once the water level inside exceeds the outside height there will be a differential pressure which will move the seal against the sediment and internal wall structure to create a water tight seal. The filled monopile is shown in FIGS. 10 and 11.

The connecting surface of the bellow 124 is profiled to the internal diameter of the monopile or structure (for example, the surface abutting the inner surface of the monopile will have a radius of curvature which corresponds to the radius of curvature of the inner surface of the monopile e.g. corresponding to a monopile diameter of 5 m). The angle of entry is typically 45 degrees for monopiles with no scour protection and 15 degrees for monopiles with scour protection (rock layers).

Figure 12A:
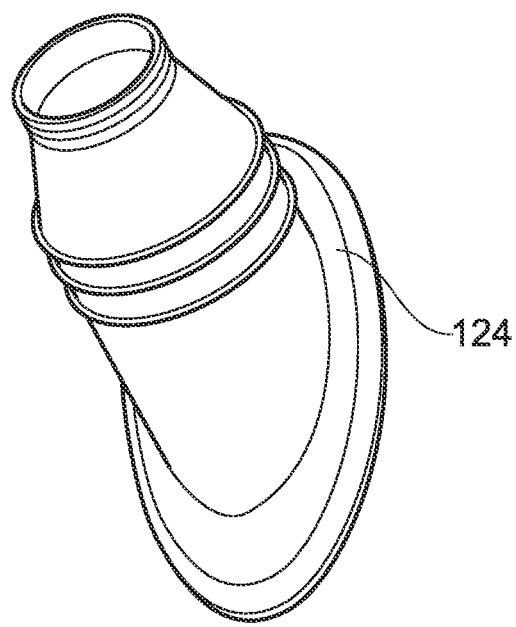
FIG. 12A shows part of the arrangement shown in FIGS. 9 to 11.

The bellows construction shown in FIG. 12A would be a polymer such as rubber or polyurethane overmoulding a strong aramid or dyneema type fibre matting. This is to provide structural rigidity to react the corresponding forces due to the differential pressures on each side of the flexible bellows/cone.

Figure 12B:
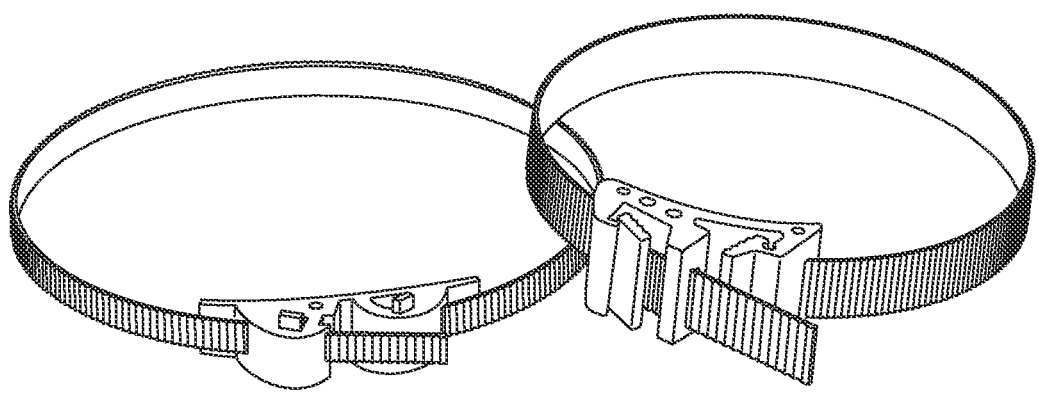
FIG. 12B shows fasteners.

The reinforced rings can either have a tube connected to them direct by bonding them in during the bellows manufacturing process or polymer band type seals, as shown in FIG. 12B (HCL fasteners—smart band) could be used to provide a water tight seal once tensioned. If the reinforced ring on the bellows fits into the polymer tube the differential pressure will create a water tight seal, providing the surface is of a suitable construction (clean, smooth, circular and flexible).

Figure 13:
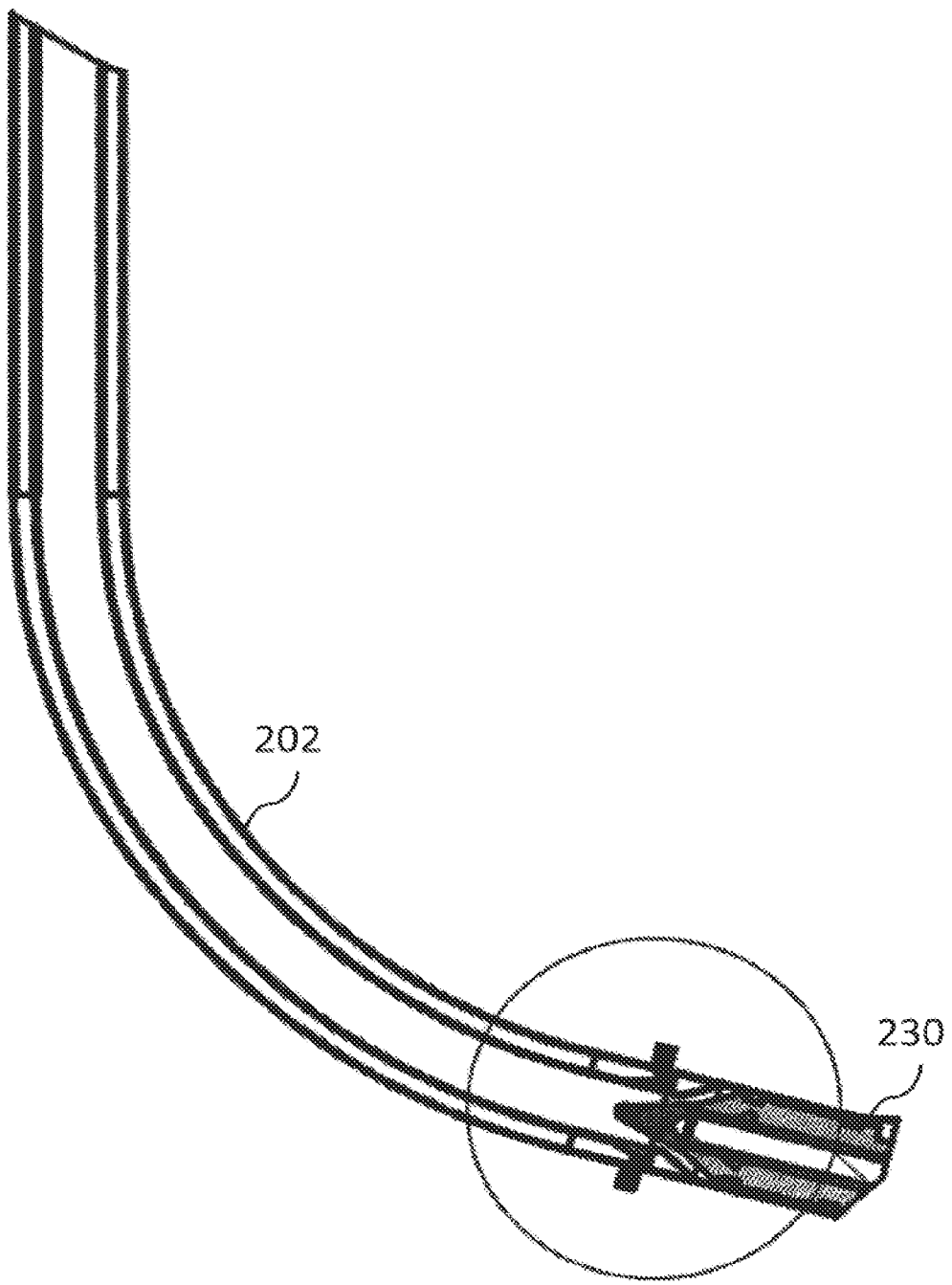
FIG. 13 is a schematic representation of an arrangement comprising a J-tube.
Figure 14:
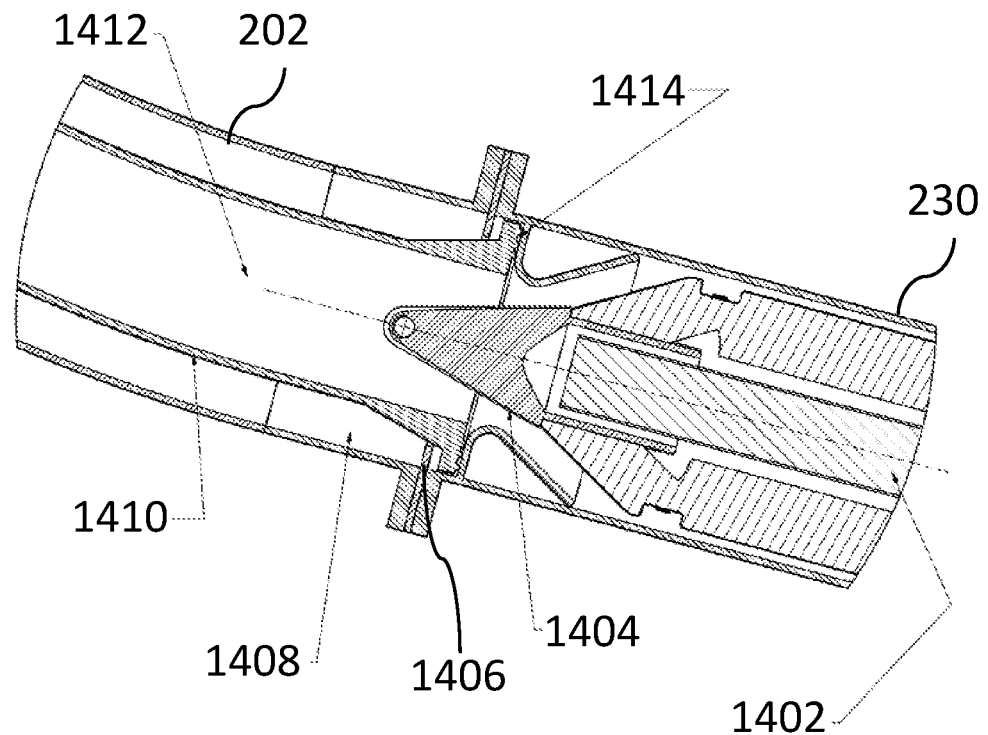
FIG. 14 shows a portion of the arrangement shown in FIG. 13.

FIG. 13 illustrates part of a J-tube arrangement 202 connected to a cable arrangement 230 for protecting a cable connected to an offshore structure (not shown). The circled portion is shown in FIG. 14. The J-tube is fitted with a sealing tube though which a cable can be drawn. A chamber is formed between the sealing tube and the outer wall of the J-tube. A retainer holds the sealing tube against an inwardly directed flange at the end of the J-tube to hold the end of the sealing tube in sealing engagement against the flange.

FIG. 14 illustrates the following: cable or flexible product 1402; pull in head 1404; retainer 1406; high pressure side 1408 (can be initiated before cable is pulled in with J-tube connector/centraliser); polymer tube or flat hose 1410 (installed onshore (low cost) such that the sealing interface can be tested onshore (this provides a major advantage over offshore installed seals as they cannot easily be tested, due to tidal variations)); low pressure within polymer tube or flat hose 1412 (free sea water exchange during tidal variations); and a single seal point 1414 for entire J-tube or I-tube.

In each embodiment in FIGS. 8 to 14, the bellows makes the seal to the structure which could be the monopile internal diameter or a J-Tube/I-Tube internal diameter or end surface. Additionally, the arrangement will seal a monopile and J-Tube if the cable has a 'yarn' outer sleeving (typically referred to in the art of submarine cables as "serving"), which cannot be used as an interface for a water tight seal.

Figure 15:
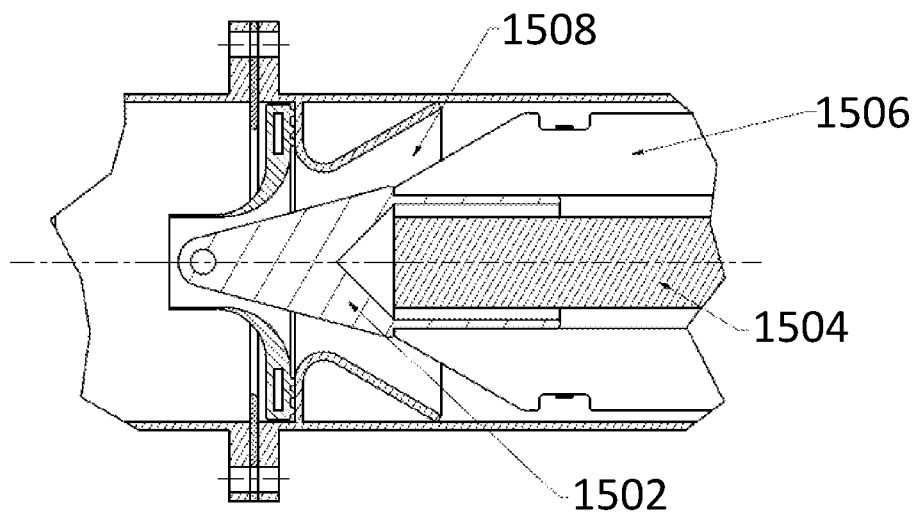
FIG. 15 shows an arrangement comprising a J-tube connector in a first configuration.

FIG. 15 illustrates part of a J-tube arrangement in which the inner surface of the conical seal makes contact with the outer diameter of the cable and the external right facing seal face makes contact with a painted steel flat surface, which is welded in place as part of the J-Tube construction. FIG. 15 further illustrates: a cable pull in head 1502; cable or flexible product 1504 (50 mm to 300 mm) (must have smooth outer serving for water tight seal); J-tube connector 1506; and low pressure inside J-tube 1508.

Figure 16:
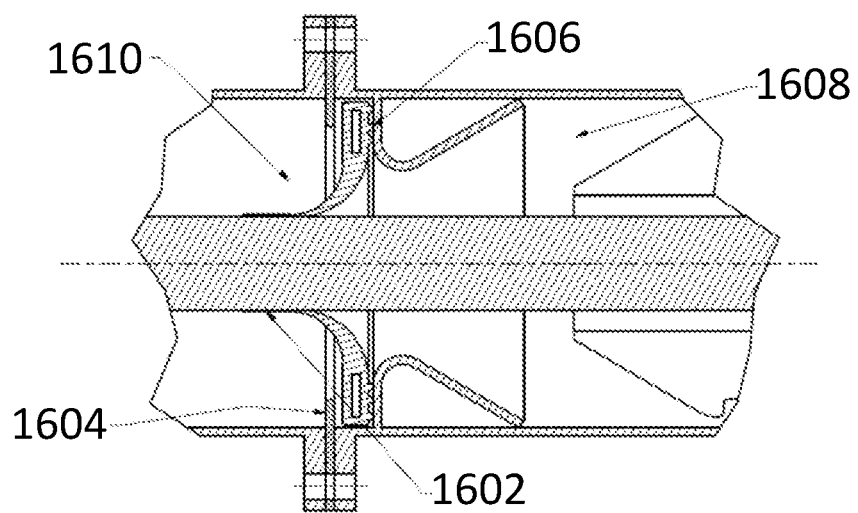
FIG. 16 shows the arrangement shown in FIG. 15 in a second configuration.

FIG. 15 shows the arrangement before installation, FIG. 16 shows the same arrangement after installation in which a sealing face of the annular seal seals against an outer surface of the cable. FIG. 16 illustrates the following: a sealing face 1602 (cable to seal); seal retainer plate 1604 (to prevent seal moving during installation); sealing face 1606 (seal to structure); low pressure (seawater side; 1608); high pressure structure side (side which requires corrosion protection; 1610).

Figure 17:
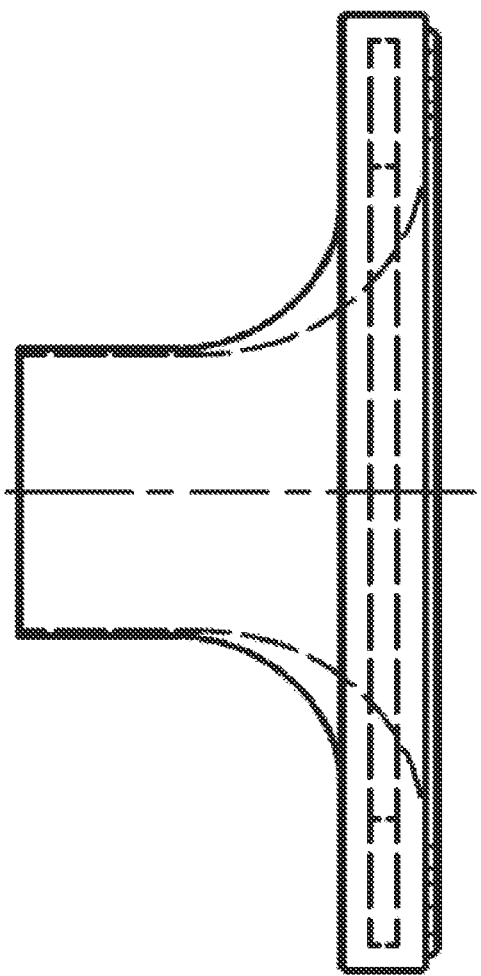
FIG. 17 shows a seal body having a reinforcing element.

FIG. 17 shows an annular seal, which may be a polymer seal, having and internal reinforcement (shown in broken lines).

Figure 18:
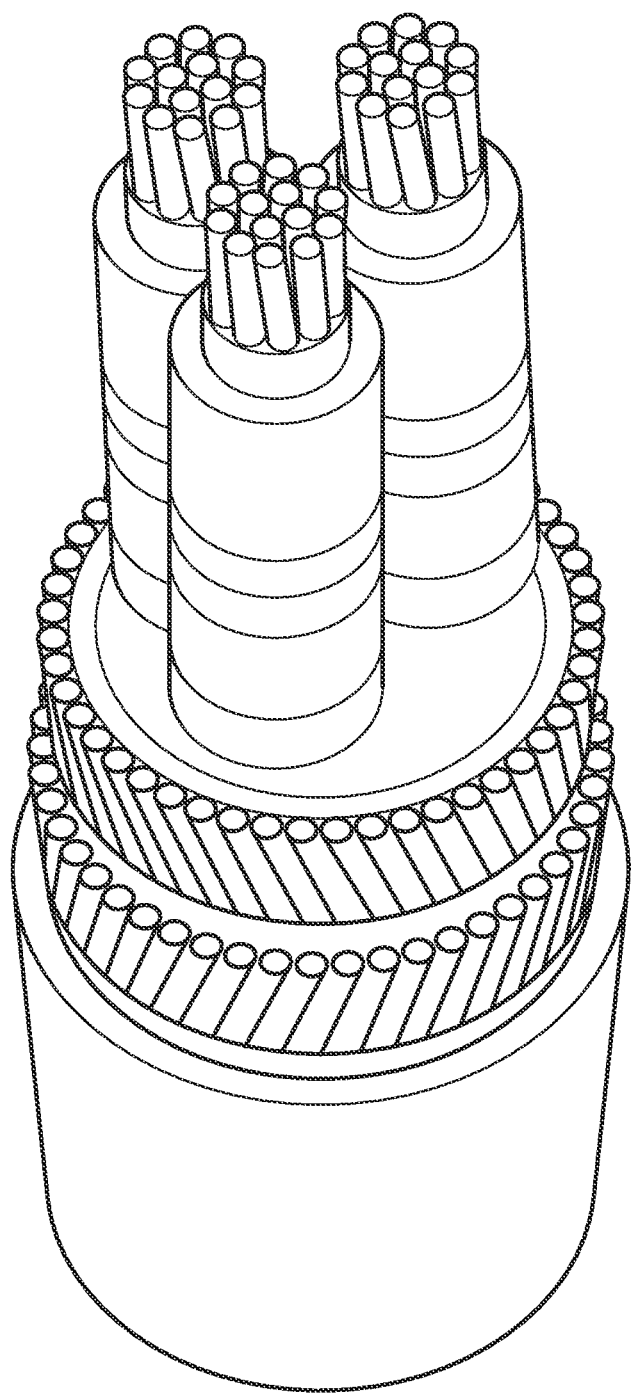
FIG. 18 shows a portion of a cable.

The described arrangements provide a simple preformed seal which has two leak paths—one between the seal outer diameter and a supporting structure and the other between the seal internal diameter and a cable (which must have a smooth water-tight outer serving, for example polyethylene or polyurethane as shown in FIG. 18).

Figure 19:
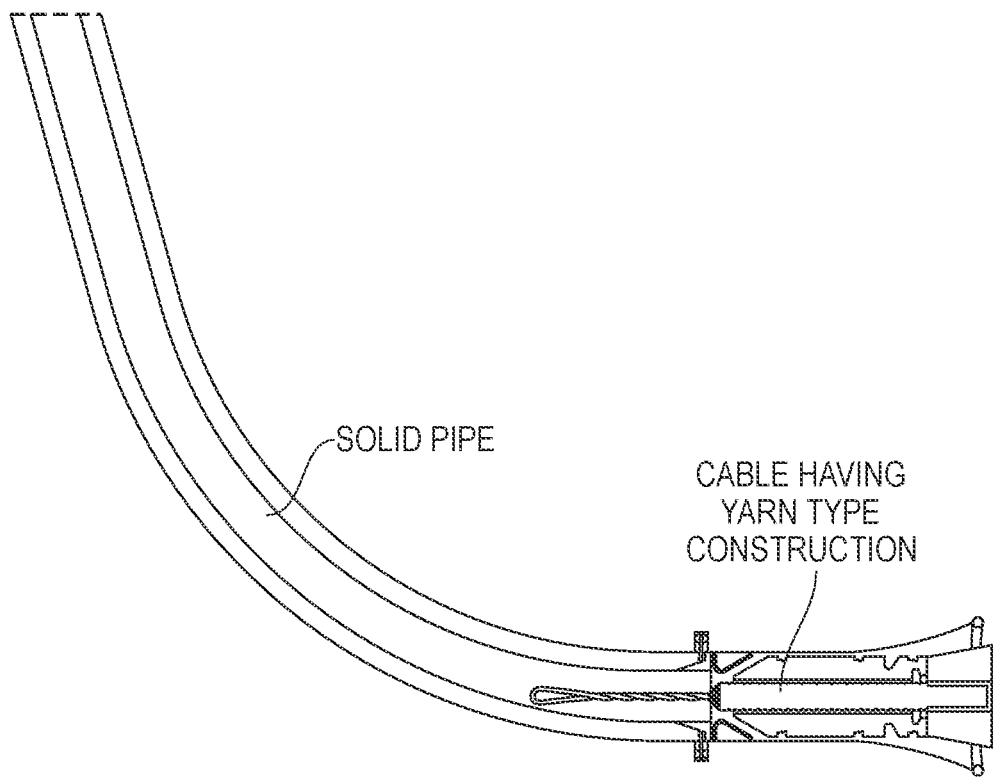
FIG. 19 shows an arrangement comprising a J-tube.
Figure 20:
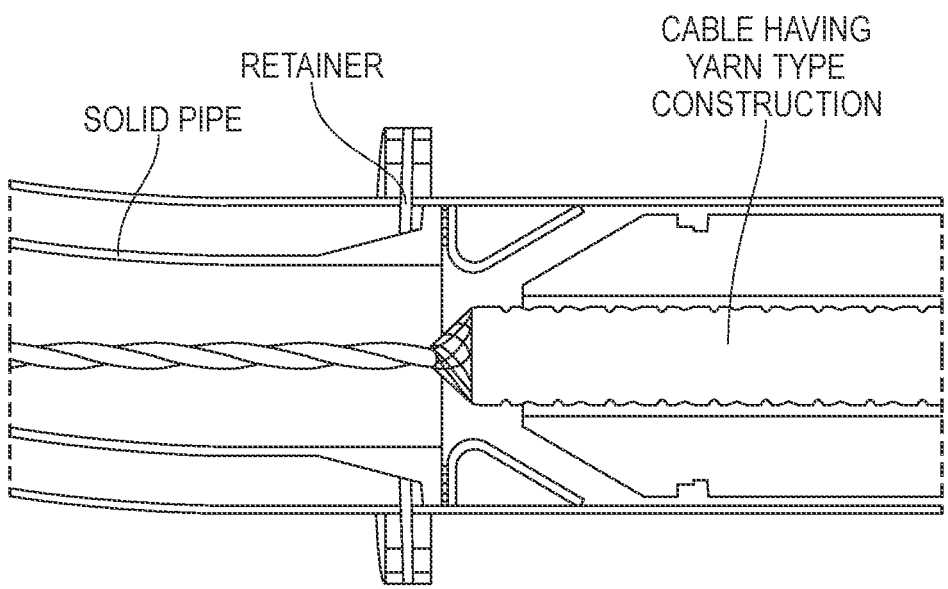
FIG. 20 shows a portion of the arrangement shown in FIG. 18.

An alternative iteration is to put a solid polymer pipe all the way down the tube, as shown in FIGS. 19 and 20. This is similar to the monopile solution described above. This provides a solution if the cable is of a yarn type construction and a water type seal not possible.

Where suitable, sealing arrangements for a J-tube maybe used in conjunction with I-tubes.

Figure 21:
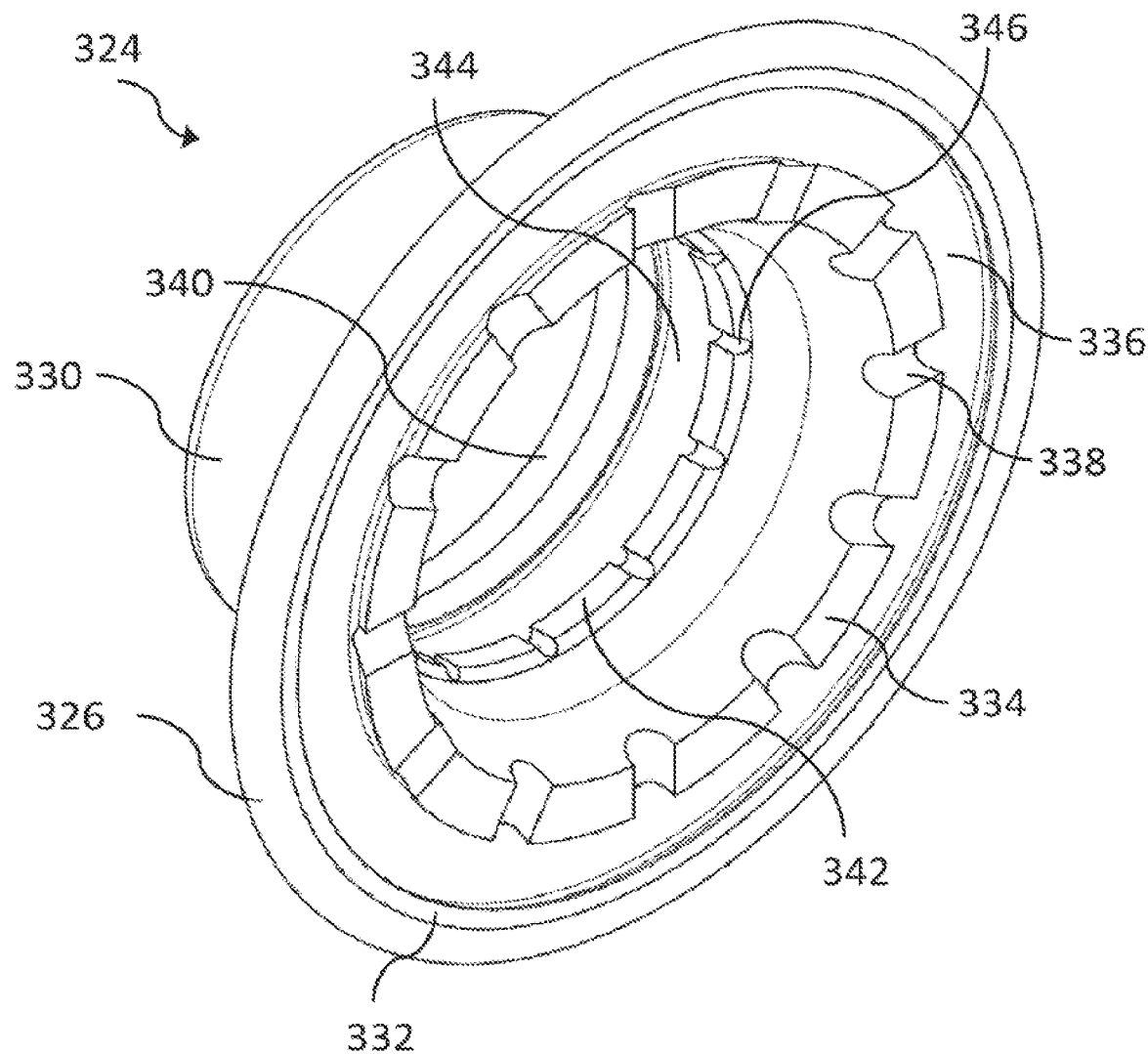
FIG. 21 shows an embodiment of an annular seal.
Figure 22:
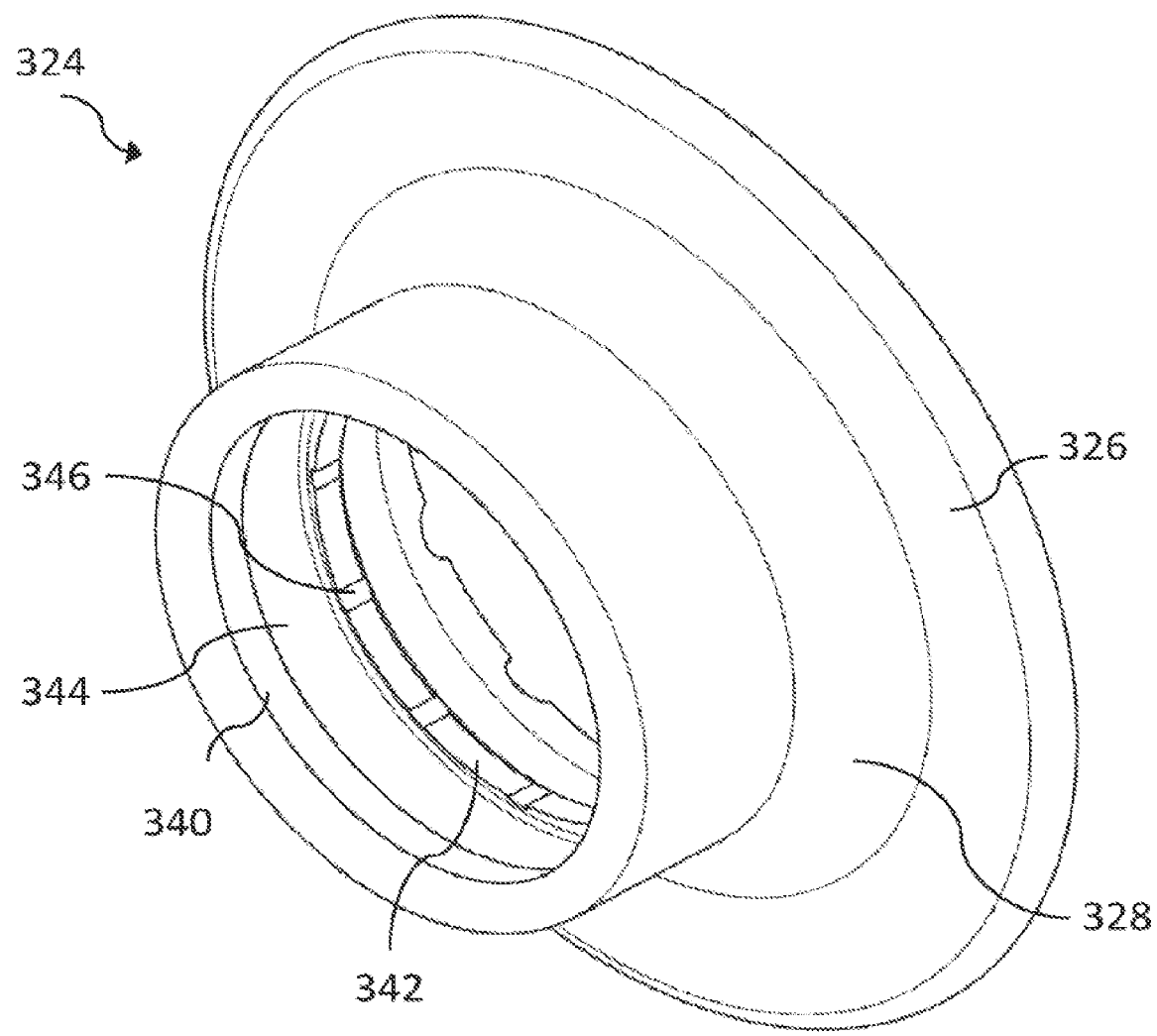
FIG. 22 is an alternative view of the annular seal shown in FIG. 21.

FIGS. 21 and 22 show an embodiment of an annular seal 324 comprising a seal body having a flange portion 326, a conical portion 328 (identified in FIG. 22) and a tubular portion 330 similar to that shown in FIGS. 2 and 3.

The flange portion 326 has a first lip 332 which extends circumferentially about the periphery of the flange portion 326 and a first annular rib 334 which extends circumferentially and is spaced radially inwardly from the first lip 332 thus defining a first annular groove 336 on the underside of the flange portion 326 between the first lip 332 and the first rib 334. A plurality of first channels 338 extend in a radial direction along the first rib 334. The first channels 338 are spaced apart from each other in a circumferential direction. In the embodiment shown, there are twelve channels 338 spaced apart equally around the first rib 334. It will, however, be appreciated that fewer or more channels 338 could be provided. It is anticipated that the greater the number of channels 338 or the greater the cross-sectional area of each channel 338, the better diffusion of liquid into the first groove 336, but the less support the first rib 334 provides for preventing the channels 338 from being compressed under an applied force against the upper surface of the flange portion 326. The two requirements must therefore be considered when setting the number and the size of the channels 338. For example, the first rib 334 could be provided with at least one channel in some circumstances. However, it is anticipated that at least two channels or at least three channels would provide an acceptable performance and that in most circumstances, at least four channels would be desirable.

The tubular portion 330 has a second lip 340 which extends circumferentially about the open end of the tubular portion 330 (i.e. the end of the tubular portion 330 which is spaced away from the conical portion 328) and a second annular rib 342 which extends circumferentially and is spaced axially (with respect to the longitudinal axis of the tubular portion 330) from the second lip 340 thus defining a second annular groove 344 on the inner surface of the tubular portion 330. A plurality of second channels 346 extend in an axial direction with respect to the longitudinal axis of the tubular portion 330. In the embodiment shown, there are twelve channels 346 spaced apart equally about the second rib 342. It will, however, be appreciated that fewer or more channels 346 could be provided. It is anticipated that the greater the number of channels 346 or the greater the cross-sectional area of each channel 346, the better diffusion of liquid into the second groove 344, but the less support the second rib 342 provides for preventing the channels 346 from being compressed under a force applied to the outer surface of the tubular portion 330. The two requirements must therefore be considered when setting the number and the size of the channels 346. For example, the second rib 342 could be provided with at least one channel in some circumstances. However, it is anticipated that at least two channels or at least three channels would provide an acceptable performance and that in most circumstances, at least four channels would be desirable.

Figure 23:
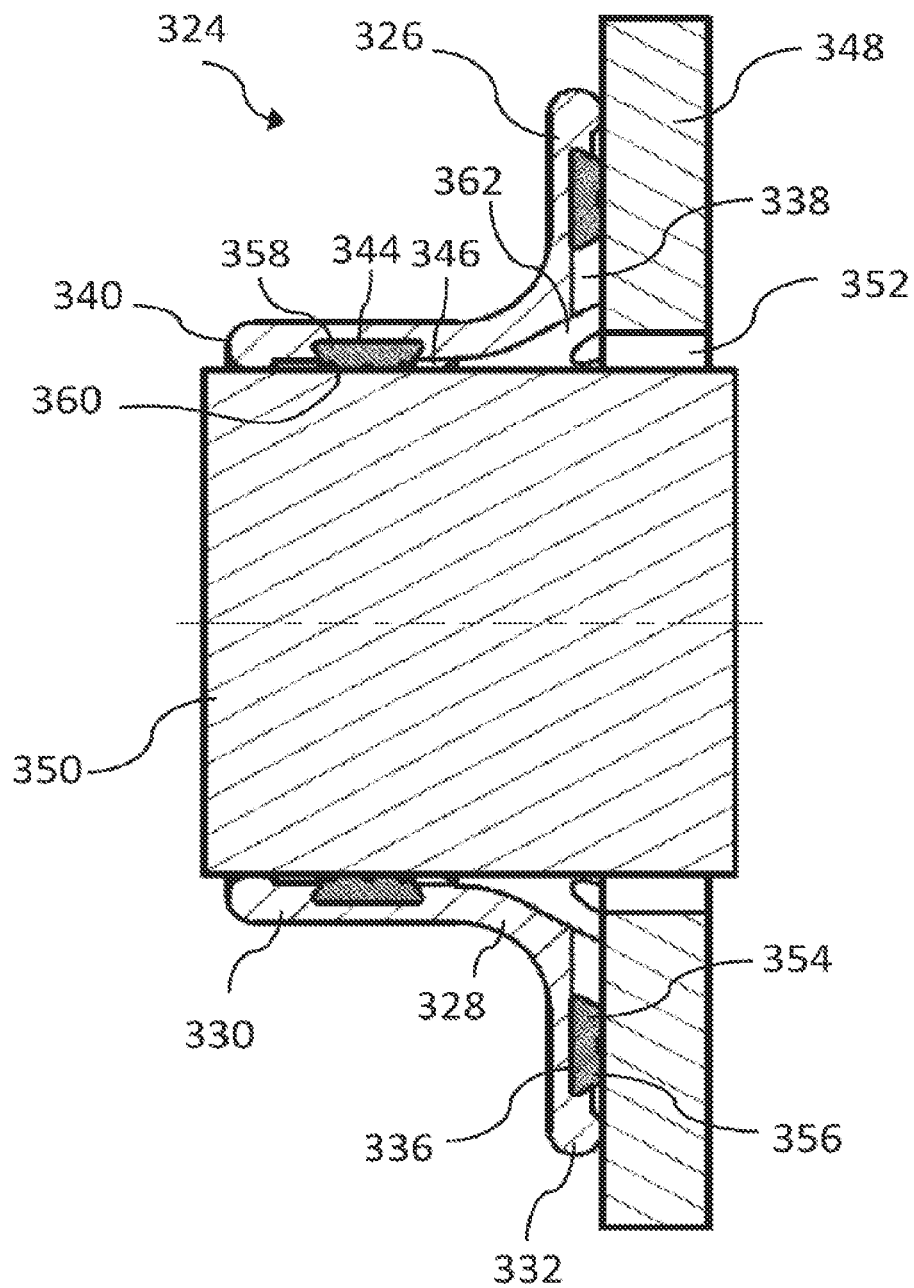
FIG. 23 is a sectional view of the annular seal shown in FIG. 21 in use.

FIG. 23 shows the annular seal 324 arranged in use to seal a wall 348 of a structure, such as a support assembly for an offshore structure, against a flexible elongate element 350, such as an elongate cable arrangement, which extends through an access port 352 provided in the wall 348. The flexible elongate element 350 has a diameter which is less than the diameter of the access port 352 so that a gap is provided between the edges/sides of the port 352 and the flexible elongate element 350.

A first sealing element 354 is disposed within the first annular groove 336. The first sealing element 354 is annular and has a cross-sectional profile which corresponds to the cross-sectional profile of the first groove 336 so that the sealing element 354 initially occupies at least 80% of the volume of the of the first groove 336 and in the embodiment shown substantially all of the second groove 336. The first sealing element 354 comprises a hydrophilic material which expands when saturated with water. The sealing element 354 has raised features in the form of annular ribs 356 to facilitate expansion of the sealing element 354 and help improve sealing.

The hydrophilic material may comprise rubber, such as polychloroprene, modified with a hydrophilic agent, such as bentonite. For subsea applications, the hydrophilic material must expand in order to provide effective sealing when exposed to seawater, typically having a salinity concentration of not less than 2%, for example not less than 3.5%.

An example of a suitable hydrophilic material is the material supplied under the name Hydrotite™ by a company called Tph Bausysteme GmbH—(see http://www.tph-bausysteme.com/en/systeme-zur-fugenabdichtung/water-swelling-sealing/) and in Japan by a company called C.I. Takiron—(see http://www.cik.co.jp/eng/products/construction/hydrotite/).

A technical datasheet for Hydrotite™ can be found at: http://www.tph-bausysteme.com/fileadmin/templates/images/datenblaetter-englisch/TDS%20HYDROTITE.pdf.

If unconstrained, a suitable hydrophilic material expands when saturated with water having a salinity concentration of at least 2.5%, such as at least 3.5%, to between 1000% and 1300% of its original (i.e. dry) volume.

The contents of these references are incorporated herein by reference.

A second sealing element 358 is disposed within the second annular groove 344. The second sealing element 358 is annular and has a cross-sectional profile which corresponds to the cross-sectional profile of the second groove 344 so that the sealing element initially occupies at least 80% of the volume of the of the second groove 344 and in the embodiment shown occupies substantially all of the second groove 344. The second sealing element 358 comprises a hydrophilic material which expands when saturated with seawater. The second sealing element 358 has raised features in the form of annular ribs 360 to facilitate expansion of the sealing element 358.

The annular seal 324, wall 348 and flexible elongate element 350 define a cavity 362 which is in fluid communication with each of the access port 352, first channels 338 and second channels 346. In FIG. 23, the arrangement is shown in a configuration in which the first and second sealing elements 354, 358 have been exposed to water such that they are both saturated and consequently expanded into the volume available within each of the respective first and second annular grooves 336, 344 and so seal against the wall 348 and the flexible elongate element 350. The installation process will be described with reference to FIG. 23 and also FIGS. 24A to 24C, in particular.

The annular seal 324 is threaded onto the flexible elongate element 350 and brought into abutting engagement with an internal surface of the wall 348, as shown in FIG. 23. In this configuration, the first lip 332 seals against the inner surface of the wall 348 and the second lip 340 seals against the outer surface of the flexible elongate element 350. As the water level rises within the structure (i.e. on the left-hand side of the wall 348, as shown in FIG. 23) above the level of the annular seal 324 (as described with respect to the earlier embodiments), the increased pressure acts on the flange portion 326 to press the first lip 332 against the inner surface of the wall 348 and against the tubular portion 330 to press the second lip 340 against the outer surface of flexible elongate element 350. The first and second lips 332, 340 therefore create a preliminary seal to seal the flexible elongate element 350 with respect to the wall 348 about the periphery of the port 352. At the same time, or subsequently, the level of water rises above the port 352 on the outside of the structure (i.e. on the right-hand side of the wall 348, as shown in FIG. 23). Seawater therefore flows in through the gap between the edge of the port 352 and the flexible elongate element 350 into the cavity 362. The seawater flows from the cavity 362 along each of the plurality of first and second channels 338, 346 into the respective first and second annular grooves 336, 344 and into contact with the first and second sealing elements 354, 358.

Figure 24A:
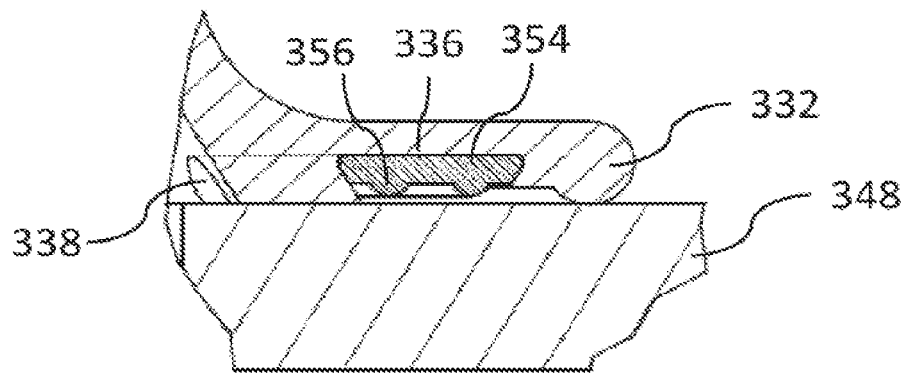
FIGS. 24A to 24C show portions of the arrangement shown in FIG. 23 in different states to aid explanation.

Initially, each of the first sealing element 354 is in an unexpanded state, as shown in FIG. 24A (which shows a partial view in the region of the flange portion 326 shown in FIG. 23 rotated clockwise through 90 degrees). The annular ribs 356 of the sealing element 354 are spaced slightly from the outer surface of the wall 348. It will be appreciated that in other embodiments the sealing element 354 may be in contact with the surface against which it is to seal when in an unexpanded state.

Figure 24B:
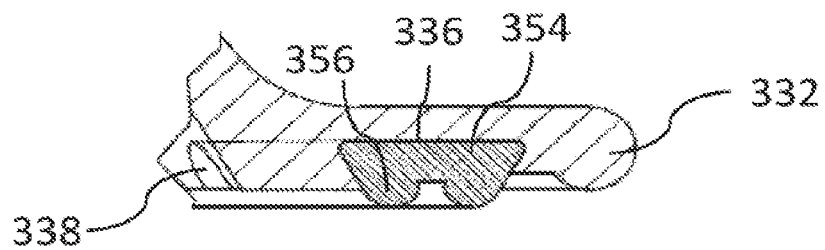
Figure 24C:
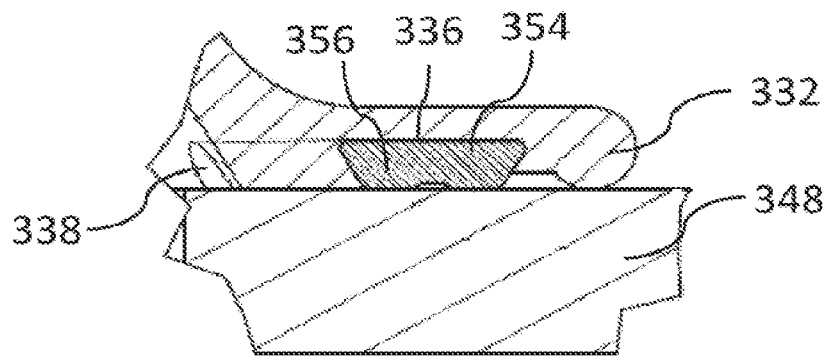

As water flows through the first channels 338 into the first annular groove 336 and into contact with the first sealing element 354, the first sealing element 354 expands, if the sealing element were unconstrained by the wall 348 it would begin to enlarge as shown in FIG. 24B (FIG. 24B is provided to aid explanation and to demonstrate the expansion characteristics of the first sealing element 354). Expansion of the first sealing element 354, however, is constrained by the wall 348 and so the ribs 356 are compressed against the inner surface of the wall 348, in the embodiment show, the groove 336 is configured such that expansion of the first sealing element is constrained so that it does not expand by more than 20% in volume. In other embodiments, expansion may be constrained to not more than 10%. The first sealing element 354 therefore exerts a force against the wall 348 and the ribs 356 are compressed and flatted out to fill the channel formed between them. The first sealing element 354, once expanded, therefore creates a fluid tight seal between the flange portion 326 and the wall 348 of the structure.

Expansion of the first sealing element 354 is dictated by the rate at which seawater permeates the material. In the application described, the seal material is a seawater expandable rubber on a polychloroprene basis. Such a material is known to expand, when unconstrained, to a volume which is not less than 1000% of its dry volume, for example up to 1300% of its dry volume and in some circumstances up to 1500% of its dry volume. Typically, a seal will begin to expand immediately on exposure to seawater, but typically will take between 20 and 40 days to expand to its fully expanded state. Initial expansion of the sealing element 354 can be delayed by covering exposed surfaces with one or more protective layers or chemical treatments that inhibit or prevent seawater from reaching the hydrophilic material for a predetermined period of time. For example protective layers or chemical treatments may be applied which delay initial expansion by at least one day or at least one week and up to two weeks, for example.

In the embodiment show, once the first sealing element is fully expanded it acts like an O-ring which is watertight to at least 5 bar, and may be configured, for example by selection of an appropriate sealing material or by configuring the geometry of the sealing element with respect to the geometry of the first annular groove 336, to be watertight up to 400 bar.

The seal may be configured to be watertight at a typical water depth, for example 20 m depth of water. The corresponding net pressure at which the seal may be watertight will be not less than 0.2 bar, for example not less than 0.5 bar, for example not less than 1 bar, for example not less than 2 bar.

The second sealing element 358 exhibit characteristics which are similar to the characteristics of the first sealing element 358, but is configured in accordance with the required size, degree of expansion and geometry.

In some embodiments, sealing by the lips 332, 340 will be adequate. However, it is expected that the hydrophilic material will be particularly advantageous when sealing against uneven surfaces, for example the external surfaces of scoured or dirty cables that may be present as a consequence of biofouling, sediment/debris or corrosion. In addition, the hydrophilic material will expand/reform to accommodate movement of the seal and changes in the surface against which it seals for example as a consequence of corrosion. In other applications, the lip can be expected to provide adequate sealing and the lip may be configured to be suitably flexible to provide a seal against a specific surface finish.

Figure 25:
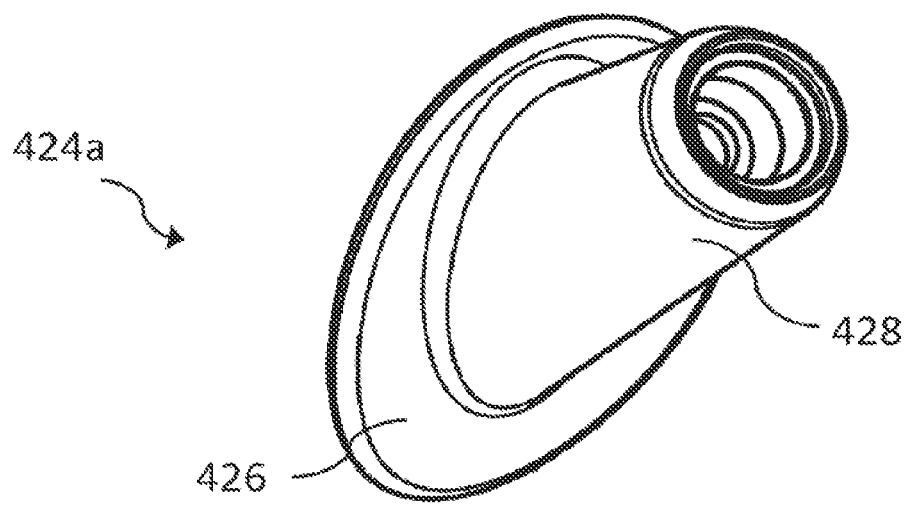
FIG. 25 is a perspective view of an embodiment of an annular seal.
Figure 26:
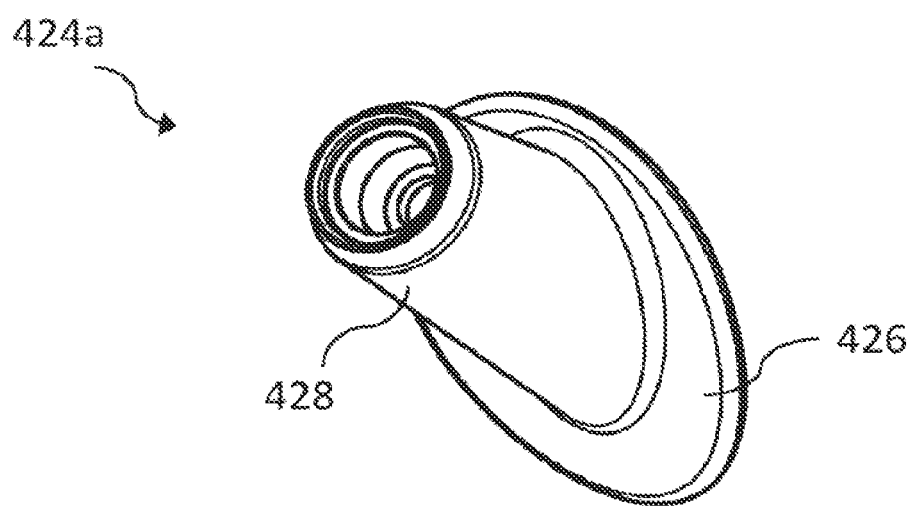
FIG. 26 is a perspective view of the annual seal shown in FIG. 25 from a different perspective.

FIGS. 25 and 26 show a base component 424a of an annular seal 424 which is similar to the annular seals described previously. The base component 424a comprises a first seal body having a flange portion 426 and a conical portion 428. The flange portion 426 may be provided with a magnetic element to aid installation and sealing and described with respect to the previous embodiments.

Figure 27:
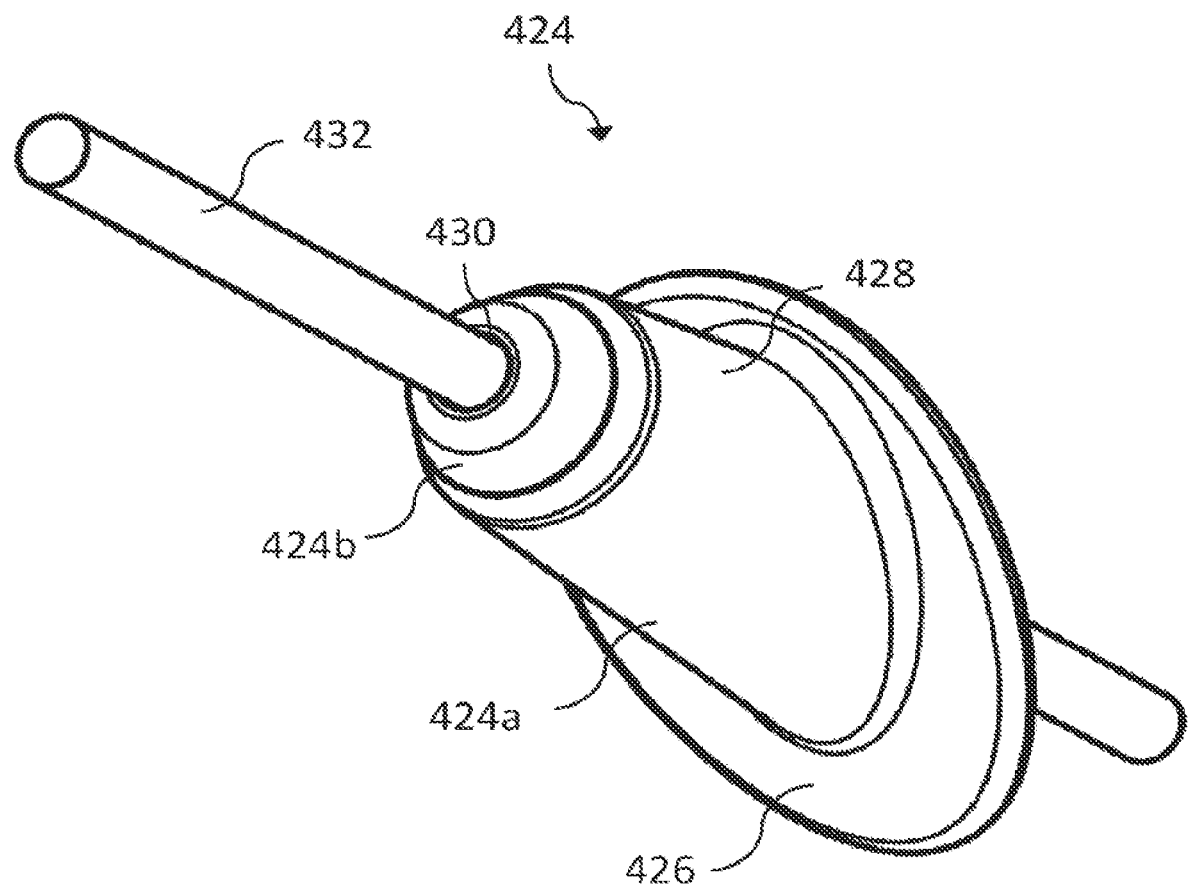
FIG. 27 shows the annular seal shown in FIG. 25 together with a portion of a cable arrangement.

FIG. 27 shows an arrangement comprising the base component 424a assembled with a cap 424b which is secured on an upper end of the base component 424a to form the annular seal 424. The cap 424b has a first aperture 430 through which a cable arrangement 432 extends. In the embodiment shown, the cable has a diameter which is between 90 mm and 180 mm, for example 100 mm.

Figure 28A:
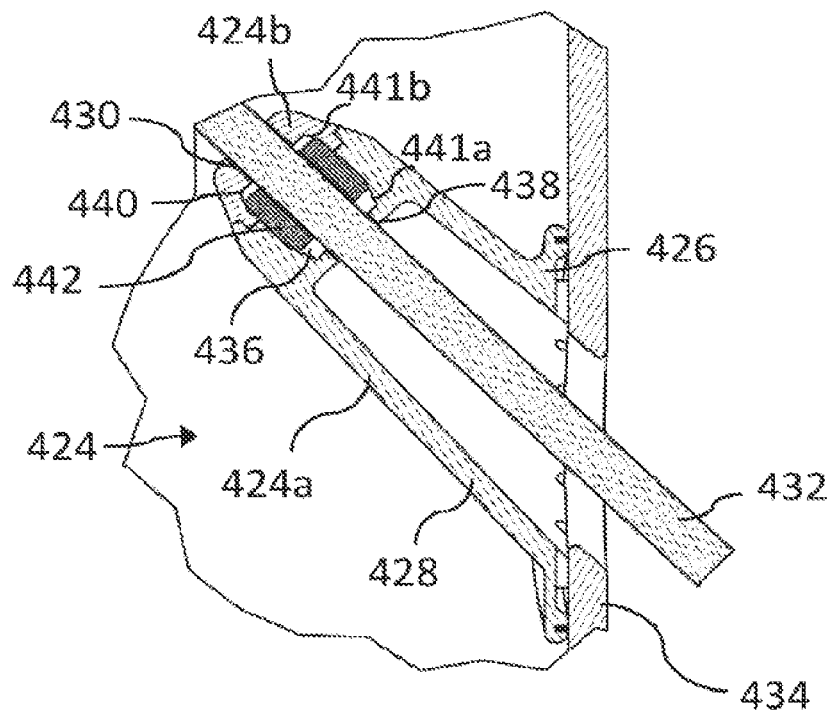
FIG. 28A is a sectional view of the arrangement shown in FIG. 26 in use when in a first state.

FIG. 28A shows a cross-sectional view of the arrangement shown in FIG. 27 when secured to a wall 434 of a structure. The base component 424a has a first cavity 436 provided at the top of the base component and has a second aperture 438 aligned with the first aperture 430 and through which the cable arrangement 432 also extends.

The cap 424b has a second cavity 440 which aligns with the first cavity 436 to define a generally cylindrical chamber 436, 440. Respective end portions 441a, 441b of the internal side walls of the base component 424a and the cap 424b which define the chamber converge along the axis of the chamber such that the chamber narrows towards each end. A sealing element 442 comprising a hydrophilic material is disposed within the chamber. The sealing element is cylindrical and has a constant diameter along its length. The sealing element 442 has a bore along its length along which the cable arrangement 432 extends. The length of the sealing element 442 is less than the length of the chamber.

The chamber defined by the base component 424a and the cap 424b is not watertight and so when the inside of the structure is filled with water, as described in connection with the previous embodiments, the chamber floods. The sealing element 442 expands axially along the chamber in opposite directions so the ends of the sealing element 442 expand into the tapered ends of the chamber. The cylindrical side wall of the chamber in the middle portion of the chamber and the tapered side walls at each end prevent the sealing element 442 from expanding radially and so the sealing element 442 exerts a sealing force against the cable arrangement 432. The tapered end regions effectively increase the compressive force on the ends of the sealing element 442 in the radial direction as the sealing element is forced into the tapered regions as a consequence of the axial expansion. The sealing effectiveness is therefore increased.

Figure 29:
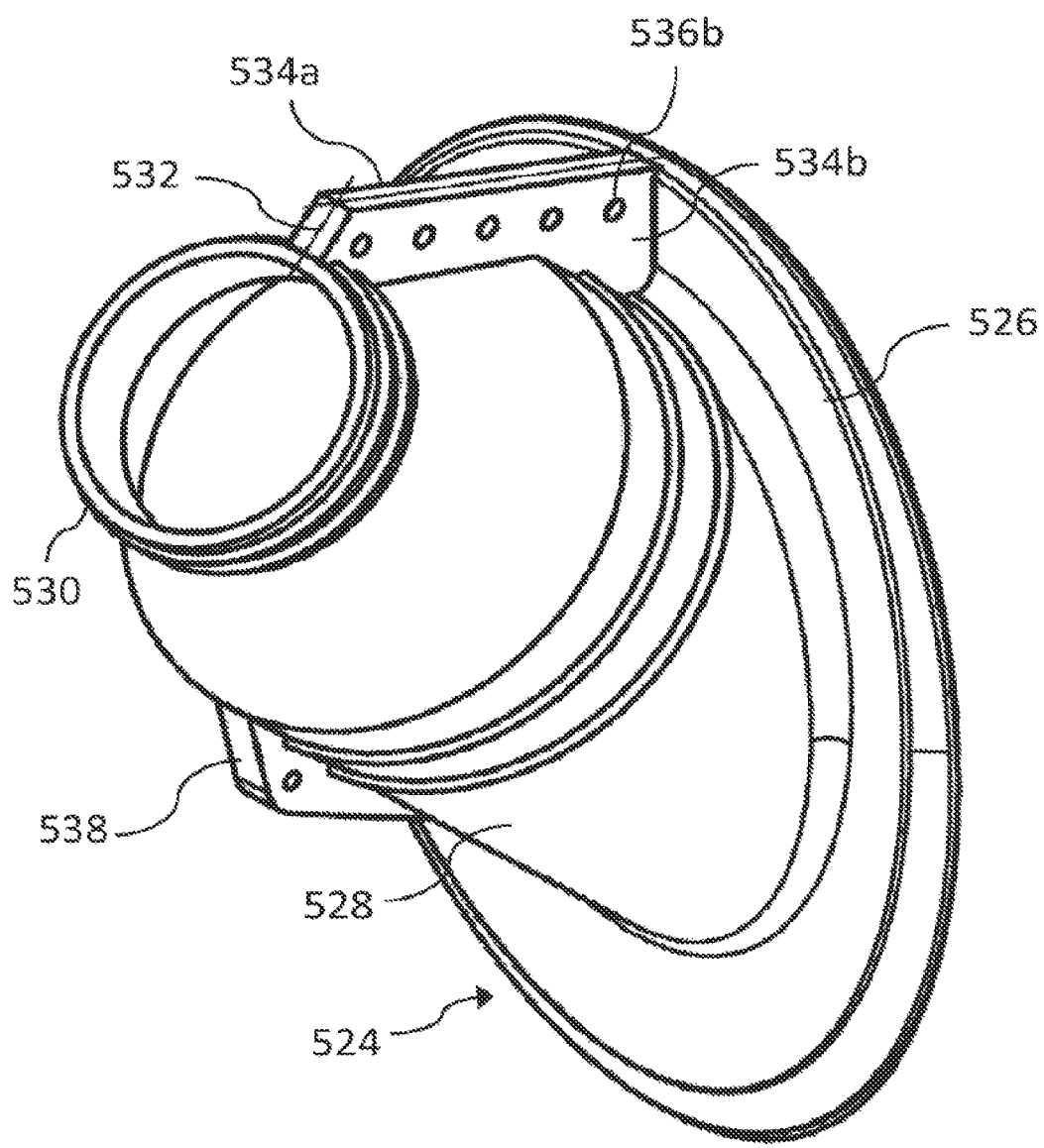
FIG. 29 is a perspective view of an embodiment of an annular seal.
Figure 30:
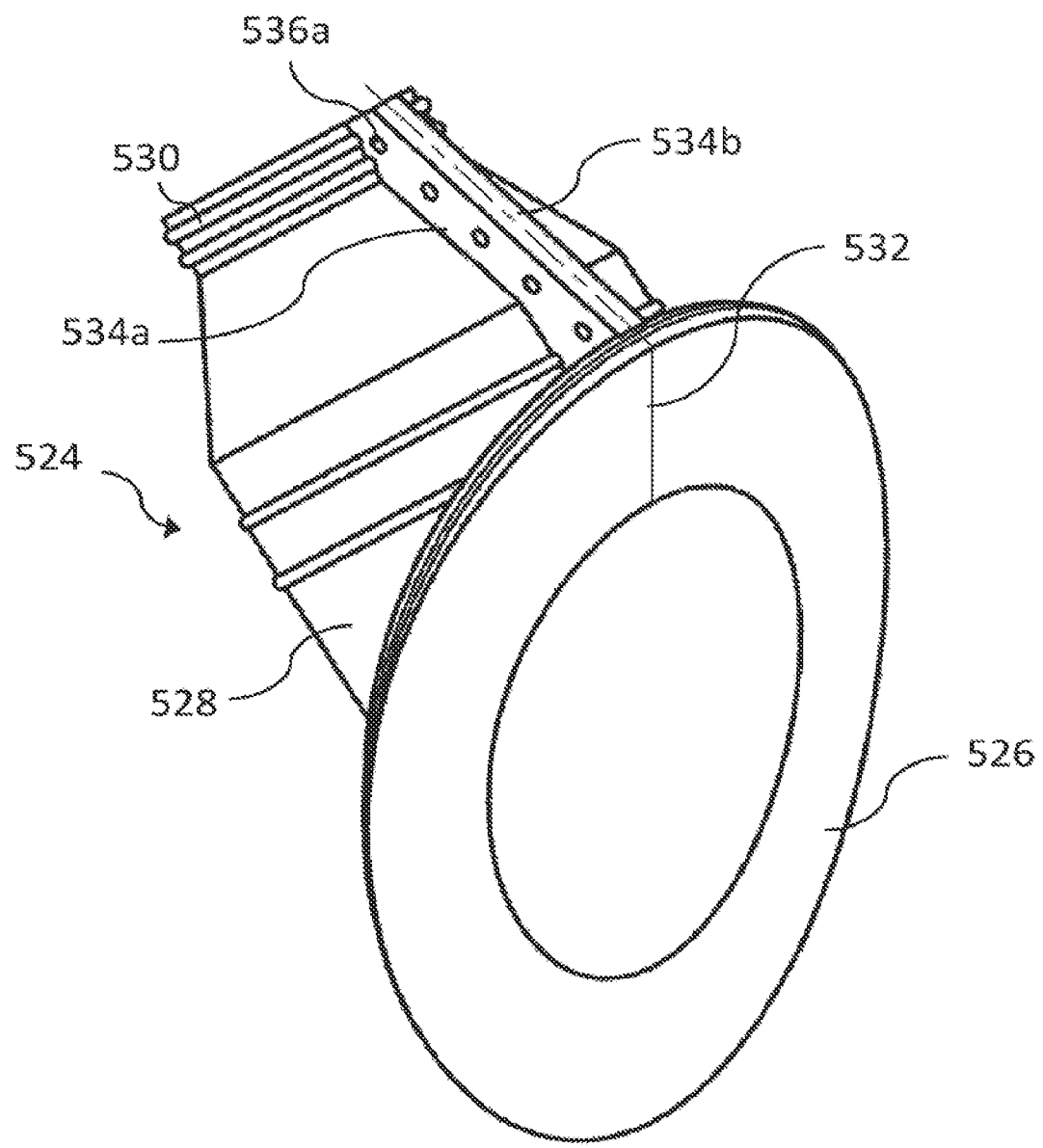
FIG. 30 is a perspective view of the annular seal shown in FIG. 29 from a different perspective.

FIG. 29 shows an annular seal 524 which is similar to the annular seals described previously. The annular seal 524 comprises a seal body having a flange portion 526, central portion 528 and a fastening portion 530. The annular seal 524 has a lengthwise split 532 through one side that extends along the length of the annular seal 524. In the embodiment show, the split 532 is provided along the shortest portion of the annular seal 524 to aid installation. The split 532 allows the annular seal 524 to be opened along its side in order to pass the seal 524 over a cable arrangement rather than having to thread the cable arrangement through the seal 524. Fasting portions 534a, 534b extend along the respective edges formed by the split 532. Each fastening portion 534a, 534b forms a flange-like protrusion which extends perpendicularly with respect to the longitudinal axis of the annular seal 524. Respective sets of holes 536a, 536b are provided in each fastening portion 534a, 534b. The sets of holes 536a, 536b are arranged so that the holes of each set 536a, 536b are aligned with each other for receiving a fastener such as a bolt or rivet. In the embodiment shown, each set of holes 536a, 536b comprises five holes. The fastening portions 534a may have a hydrophilic material, such as the hydrophilic material described previously, located between them to aid sealing.

The central portion 528 comprises an attachment 538 at a lower region for attachment of a clump weight in order to aid installation by overcoming any natural buoyancy of annular seal 524 (when installed on a submerged structure) or drag/restrictions in the installation apparatus when the annular seal 524 needs to be lowered into position.

In the present embodiment, the annular seal 524 is formed from a material having a resilience which allows for the annular seal 524 to be separated along the split 532 for insertion of a cable arrangement.

Figure 31:
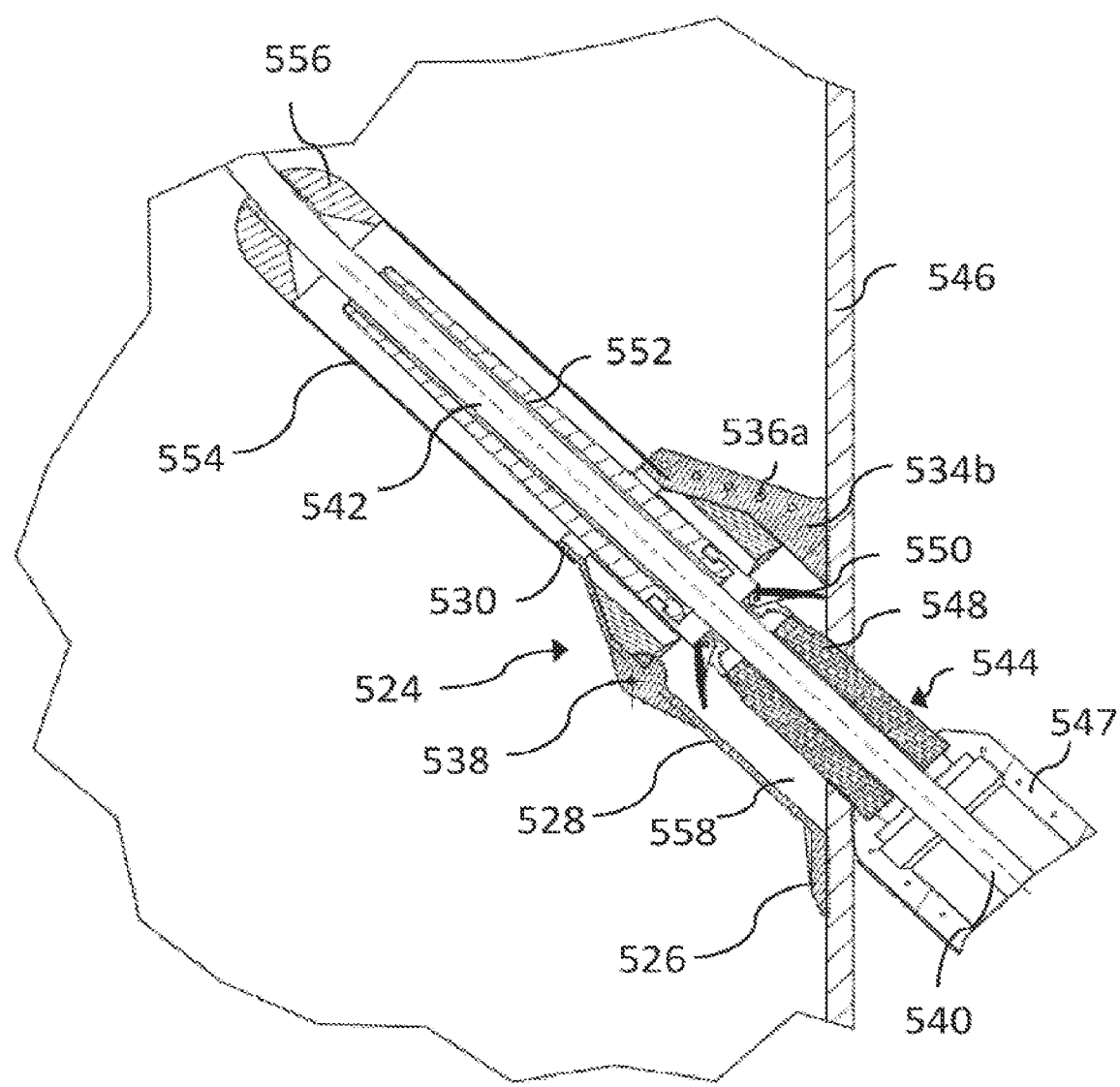
FIG. 31 shows the annular seal shown in FIG. 29 in use.

FIG. 31 shows the annular seal 524 shown in FIG. 29 being used to form a seal between a cable arrangement 540 comprising a cable 542 and a cable protection system 544 and a wall 546 of a structure, such as a monopile for a wind turbine.

The cable protection system 544 comprises a sheath 547, a mechanical connector 548 having retaining features 550 which secure the connector to the wall 546 of the structure, and a bend stiffener 552 which extends from the connector 548 along a portion of the cable 542 to resist excessive bending of the cable 542 in the vicinity of the connector 548 during installation and subsequent operation.

Figure 28B:
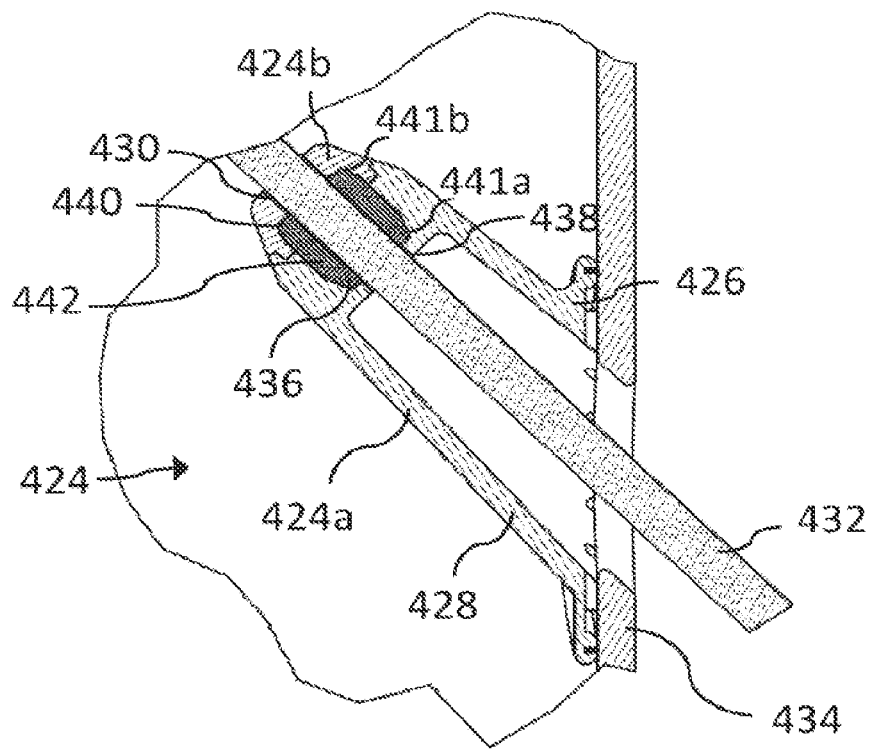
FIG. 28B corresponds to the sectional view shown in FIG. 28A when in a second state.

A flexible tube 554 is secured to the fastening portion 530 of the annular seal 524. The flexible tube 554 extends from the fastening portion 530 along the cable 542 over the free end of the bend stiffener 552. A sealing element 556 is secured to the end of the flexible tube 554 not connected to the fastening portion 530. The sealing element 556 may comprise a hydrophilic material housed with a chamber defined by a housing similar to the arrangement shown in FIGS. 28A and 28B. The flexible tube 554 may be a flat hose having a split which corresponds to the split 532 and may be zipped/bolted around the cable arrangement 540 together with the annular seal 524 after installation of the cable arrangement 540 without having to disconnect the cable arrangement 540. The length of the flexible tube 554 may be set in accordance with requirements. For example, in the embodiment shown, the length of the flexible tube 554 is sufficient for the sealing element 556 to seal against the cable 542 rather than the bend stiffener 552. In other embodiments, the length of the flexible tube 554 is sufficient for the sealing element 556 to seal against a relatively clean portion of the cable 542, for example a portion of the cable 542 which is close to a hang-off point within a monopile. In other embodiments, the length of the flexible tube 554 is sufficient so that it can be connected directly to a hang-off point rather than sealing directly against the cable 542. The length of the flexible tube 554 may be at least 1 m or at least 5 m or at least 10 m or at least 20 m or at least 30 m. In use, the flexible tube 554 may be pressed against the cable 542 and/or bend stiffener 552 when the pressure within the flexible tube 554 is less than the external pressure acting on the flexible tube 554, which can also be expected to improve sealing. A void 558 is defined by the annular seal 524 around the connector 548 for retention of debris, for example damaged components. The flange portion 526 may be provided with a magnetic element to aid installation and sealing and described with respect to the previous embodiments.

Figure 32:
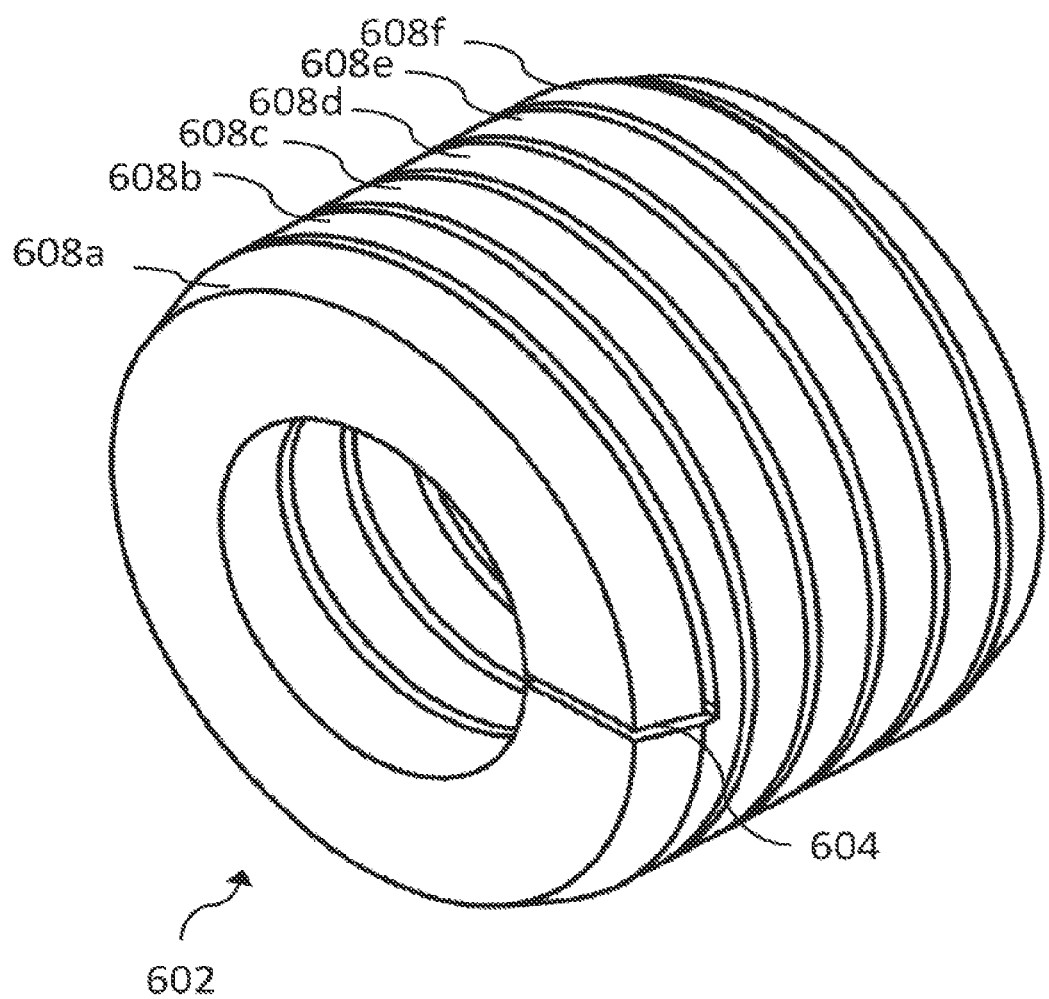
FIG. 32 is a perspective view of a sealing element.
Figure 33:
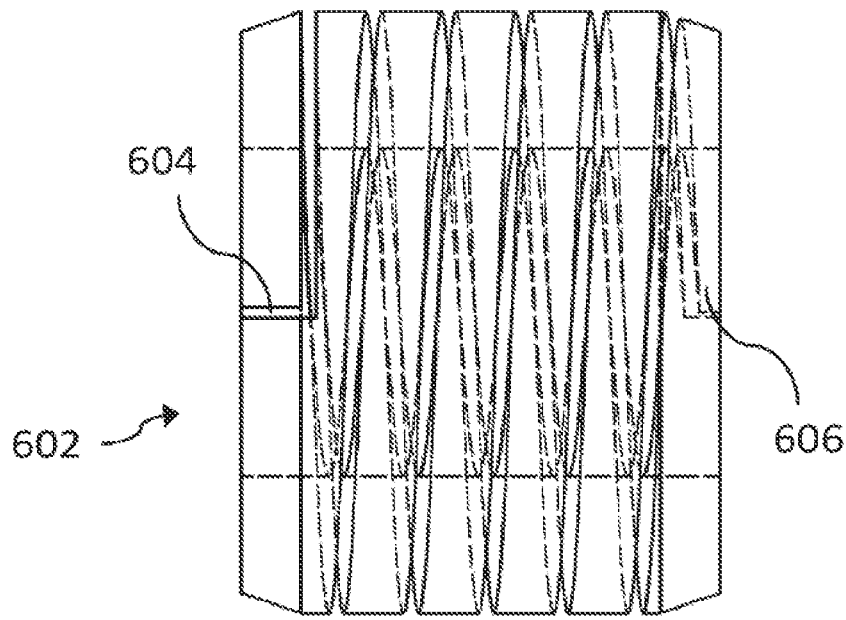
FIG. 33 is a side view of the sealing element shown in FIG. 32.
Figure 34:
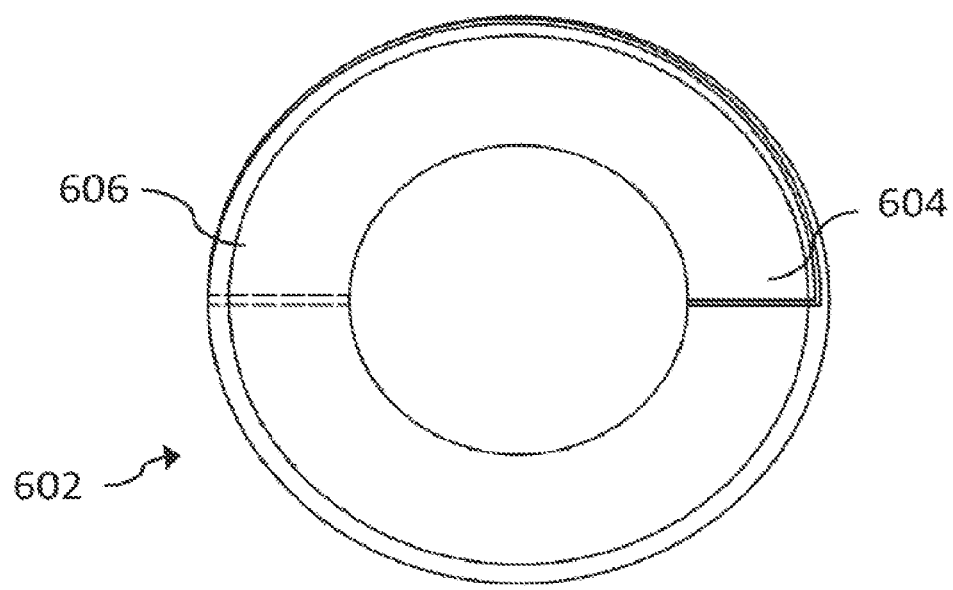
FIG. 34 is an end view of the sealing element shown in FIG. 32.

FIGS. 32 to 34 shows a sealing element 602 which is suitable for use in the arrangement shown in FIGS. 25 to 28B and FIGS. 29 to 31, in particular.

The sealing element 602 is formed from a hydrophilic material as described with respect to the previous embodiments. The sealing element is a single piece of material forming an integrated structure which may be moulded and then cut into the desired shape. The sealing element 602 is helical and has a first end 604 and a second end 606. The sealing element 602 of the embodiment shown has six coils 608a, 608b, 608c, 608d, 608e, 608f between the first and second ends 604, 606. It will be appreciated that fewer or more coils could be provided. For example, the sealing element 602 may comprise at least two coils, for example at least three coils or at least four coils.

The sealing element 602 is resilient and so can be installed on an in-situ cable by inserting a cable between an end 602, 604 and an adjacent coil and then 'winding' the sealing element 602 onto the cable until it releases at the other end 602, 604. When exposed to water, the coils 608a, 608b, 608c, 608d, 608e, 608f expand both axially and radially in order to seal against the cable and each other. The tortuous leak path defined by the helical arrangement provides excellent sealing to prevent leakage through the sealing element 602.

In the drawings like reference numerals refer to like parts.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings) or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. An annular seal member, comprising:
   a seal body comprising a locating portion locatable against a wall element of an offshore structure, an inner surface, an outer surface and a lip portion that defines an open mouth of the seal member for receiving an elongate element therethrough,
   wherein the seal body is locatable against the wall element such that when a static pressure acting on the outer surface of the seal body exceeds a static pressure acting on the inner surface of the seal body a net positive pressure is exerted on the outer surface which at least partly deforms inwardly to provide a portion of the seal body for sealing against an outer surface of the elongate element, wherein the locating portion comprises a flange portion that comprises at least one circumferentially extending groove that comprises a circumferentially extending recess region, wherein at least one aperture is provided in a circumferentially extending wall of the groove, and wherein the at least one aperture is in fluid communication with the groove.

2. The seal member of claim 1, wherein the elongate element comprises an umbilical or power cable or the like, the elongate element being flexible.

3. The seal member of claim 1, wherein the seal body comprises a resilient material which deforms under the net positive pressure.

4. The seal member of claim 1, wherein the recess region comprises a hydrophilic material, the hydrophilic material comprising rubber modified with a hydrophilic substance.

5. The seal member of claim 1, wherein the flange portion comprises at least one magnetic element for securing the flange portion to the wall element.

6. The seal member of claim 1, wherein the seal body comprises an intermediate portion extending in the direction from the locating portion to the lip portion, at least part of the outer surface and at least part of the inner surface being provided on the intermediate portion, wherein the intermediate portion converges towards the lip portion, the intermediate portion being substantially frusto-conical.

7. The seal member of claim 6, wherein the intermediate portion defines a chamber for receiving the elongate element which is larger than the space occupied by the elongate element within the chamber.

8. The seal member of claim 1, wherein the seal body comprises a resilient material and at least one split is provided along the length of the seal body such that the seal body is openable along the split for insertion of an elongate element.

9. The seal member of claim 8, wherein the seal body comprises a first fastening portion on a first portion of the seal body adjacent the split and a second fastening portion on a second portion of the seal body adjacent an opposite side of the split, wherein the fastening portions are arranged to be secured together.

10. The seal member of claim 1, wherein the seal body comprises a flexible tubular element which extends along a region of the seal body between the lip portion and a portion of the seal body which is locatable against the wall element.

11. The seal member of claim 10, wherein the flexible tubular element is at least 1 m or at least 5 m or at least 10 m or at least 20 m or at least 30 m in length.

12. The seal member of claim 1, wherein the seal body defines a chamber through which, when received, the elongate element extends, the chamber is configured for receiving an annular hydrophilic sealing element, and the seal body is configured to constrain expansion of the hydrophilic sealing element within the chamber in at least one direction.

13. The seal member of claim 12, wherein at least a portion of the chamber converges towards one end of the chamber.

14. The seal member of claim 12, wherein the seal body is configured to constrain expansion of the hydrophilic sealing element within the chamber in a direction which is perpendicular to the direction in which the cable extends through the chamber when received in the chamber.

15. The seal member of claim 1, wherein the groove comprises an annular groove or a plurality of circumferential grooves held apart by circumferentially spaced webs.

16. An annular seal member, comprising:
- a seal body comprising a locating portion locatable against a wall element of an offshore structure, an inner surface, an outer surface and a lip portion that defines an open mouth of the seal member for receiving an elongate element therethrough; wherein
- the seal body is locatable against the wall element such that when a static pressure acting on the outer surface of the seal body exceeds a static pressure acting on the inner surface of the seal body a net positive pressure is exerted on the outer surface which at least partly deforms inwardly to provide a portion of the seal body for sealing against an outer surface of the elongate element, wherein the lip portion comprises at least one groove that comprises a lip recess region that extends circumferentially around, and on, an inner surface of the lip portion, and wherein the lip recess region comprises a hydrophilic material.

17. The seal member of claim 16, wherein the hydrophilic material comprises rubber modified with a hydrophilic substance.

18. A sealing element comprising a hydrophilic material, wherein:
- at least a portion of the sealing element is helical defining a tortuous leak path;
- the sealing element is expandable both axially and radially when exposed to water;
- the sealing element is a single piece of material forming an integrated structure; and
- the sealing element has free ends such that the sealing element can be fitted to an elongate element by inserting the elongate element between a free end and an adjacent coil formed by a helical arrangement and then moving the elongate element between the coils until the elongate element exits from between the other free end and an adjacent coil so that the sealing element is wound around the elongate element.

19. The sealing element of claim 18, wherein the hydrophilic material comprises rubber modified with a hydrophilic substance.

20. The sealing element of claim 18, wherein the sealing element comprises at least two coils or at least three coils or at least four coils.

* * * * *